(12) United States Patent
Bertelsen

(10) Patent No.: US 8,385,812 B2
(45) Date of Patent: Feb. 26, 2013

(54) ASSESSMENT-DRIVEN COGNITION SYSTEM

(75) Inventor: Jim Bertelsen, Centennial, CO (US)

(73) Assignee: Jones International, Ltd., Centennial, CO (US)

( * ) Notice: Subject to any disclaimer, the term of this patent is extended or adjusted under 35 U.S.C. 154(b) by 773 days.

(21) Appl. No.: 12/406,855

(22) Filed: Mar. 18, 2009

(65) Prior Publication Data

US 2010/0068687 A1 Mar. 18, 2010

Related U.S. Application Data

(60) Provisional application No. 61/037,648, filed on Mar. 18, 2008.

(51) Int. Cl.
*G09B 3/00* (2006.01)
*G09B 7/00* (2006.01)

(52) U.S. Cl. ........ 434/362; 434/322; 434/323; 434/350; 434/353

(58) Field of Classification Search .................. 434/322, 434/323, 350, 362
See application file for complete search history.

(56) References Cited

U.S. PATENT DOCUMENTS

| | | | |
|---|---|---|---|
| 3,748,754 A | 7/1973 | LaBerge | |
| 5,059,127 A * | 10/1991 | Lewis et al. | 434/353 |
| 5,103,408 A * | 4/1992 | Greenberg et al. | 434/323 |
| 5,437,553 A | 8/1995 | Collins | |
| 5,494,444 A | 2/1996 | Thayer | |
| 5,597,312 A * | 1/1997 | Bloom et al. | 434/362 |
| 5,657,256 A * | 8/1997 | Swanson et al. | 702/119 |
| 5,727,951 A | 3/1998 | Tong | |
| 5,778,380 A | 7/1998 | Siefert | |
| 5,797,601 A | 8/1998 | Ritchie | |
| 5,888,071 A | 3/1999 | Takamori | |
| 6,022,221 A | 2/2000 | Boon | |
| 6,024,572 A | 2/2000 | Weyer | |
| 6,039,575 A | 3/2000 | L'Allier | |
| 6,077,085 A | 6/2000 | Parry | |
| 6,419,496 B1 | 7/2002 | Vaughan, Jr. | |
| 6,921,268 B2 | 7/2005 | Bruno et al. | |
| 2002/0115048 A1 | 8/2002 | Meimer | |
| 2003/0077559 A1 | 4/2003 | Braunberger | |
| 2003/0129574 A1 | 7/2003 | Ferriol | |
| 2003/0190592 A1 | 10/2003 | Bruno | |
| 2003/0228561 A1 * | 12/2003 | Escalante | 434/219 |
| 2004/0009462 A1 * | 1/2004 | McElwrath | 434/350 |

(Continued)

OTHER PUBLICATIONS

Description of BufoVok screenshot [BufoVok 2.11 or 2.1 by BufoPro, http://www.quingle.com/softarea/flash-l.htm) last accessed on May 14, 2009.

(Continued)

*Primary Examiner* — Nikolai A Gishnock
(74) *Attorney, Agent, or Firm* — Faegre Baker Daniels LLP

(57) ABSTRACT

A computer-based assessment driven cognition system includes, in embodiments, a generator configured to present questions, where each question presented is associated with a stacking weight and has at least one correct response, and a question property evaluator configured to, for each question presented, determine a likelihood of randomly selecting the at least one correct response. The system also includes a question response receiver configured to receive at least one response to each question presented. Additionally, the system includes a question response evaluator configured to determine, for each question presented, when the at least one response is the at least one associated correct response, a likelihood that the at least one response is a false positive. The question response evaluator is further configured to adjust the stacking weight of each question presented depending at least upon the likelihood that the at least one response to the question is a false positive.

26 Claims, 32 Drawing Sheets

U.S. PATENT DOCUMENTS

| | | | |
|---|---|---|---|
| 2004/0014016 A1* | 1/2004 | Popeck et al. | 434/322 |
| 2005/0003337 A1* | 1/2005 | Berman | 434/323 |
| 2005/0196730 A1 | 9/2005 | Kellman | |
| 2005/0227215 A1 | 10/2005 | Bruno | |
| 2006/0003303 A1* | 1/2006 | Almond et al. | 434/322 |
| 2006/0029920 A1 | 2/2006 | Bruno | |
| 2006/0035204 A1* | 2/2006 | LaMarche et al. | 434/350 |
| 2006/0099562 A1 | 5/2006 | Carlsson | |
| 2006/0099563 A1 | 5/2006 | Liu et al. | |
| 2006/0172276 A1* | 8/2006 | Higgins et al. | 434/362 |
| 2007/0190505 A1 | 8/2007 | Hugonnard-Bruyere | |
| 2007/0275357 A1 | 11/2007 | Resor | |
| 2008/0050712 A1* | 2/2008 | Madani et al. | 434/350 |
| 2008/0254436 A1* | 10/2008 | Morgia et al. | 434/362 |

OTHER PUBLICATIONS

Description of LingoMaxx 1.0 German interface; LingoMaxx screenshot by Gekkosoft, http://www.quingle.com/softarea/flash-l.htm), last accessed on May 14, 2009.

Description of Lernsystem Pro; German interface by Lutz Hülsdunk; Temporarily freeware, formerly Shareware, http://www.quingle.com/softarea/flash-l.htm), last accessed on May 14, 2009.

Description of Langenscheidts Vokabeltrainer 2.0; German interface; Langenscheidt's screenshot by Joerg-Michael Grassau, http://www.quingle.com/softarea/flash-l.htm) last accessed on May 14, 2009.

Description of Vokabelstar (Graessl); German interface by Christoph Gräßl 1999 http://www.quingle.com/softarea/flash-v.htm), last accessed on May 14, 2009.

Description of VocabWorks 1.2.7; VocabWorks by Karl B. Jones 2003, http://www.quingle.com/softarea/flash-v.htm), last accessed on May 14, 2009.

Description of Rating criteria, http://www.quingle.com/softarea/flash-cr.htm), last accessed on May 14, 2009.

Flashcard Applications Online http://www.foolsworkshop.com/fw/flashcardapps.html), last accessed on May 14, 2009.

Description of VTrain 4.5 by Paul Rädle, http://www.quingle.com/softarea/flash-v.htm, last accessed on May 14, 2009.

Description of Leitner Cardfile System, http://www.flashcardexchange.com/docs/leitner, 2001.

Bufo Project, http://www.bufopro.de/, last accessed on May 14, 2009.

Gekko Software, http://www.gekkosoft.com/, last accessed on May 14, 2009.

Edworks, http://www.edworks.de/, last accessed on May 14, 2009.

Langenscheidt Vokabeltrainer, http://www.vokabeln.de/, last accessed on May 14, 2009.

VocabWorks, http://www.aireville.fsnet.co.uk/vocabworks/index.htm, last accessed on May 14, 2009.

VTrain.net, http://www.paul-raedle.de/vtrain/home.htm, 1999.

International Search Report and Written Opinion for PCT Application No. PCT/US2009/037574, mailed May 20, 2009.

* cited by examiner

|  |  | Questions |  |  |  |  |  |  |  |
|---|---|---|---|---|---|---|---|---|---|
|  |  | 1 | 2 | 3 | 4 | 5 | 6 | 7 | 8 |
| Answer Options | 1 | 1 | 1 | 1 | 1 | 1 | 1 | 1 | 1 |
|  | 2 | 0 | 0 | 0 | 0 | 1 | 1 | 1 | 1 |
|  | 3 |  |  | 0 | 0 | 0 | 0 | 1 | 1 |
|  | 4 |  |  | 0 | 0 | 0 | 0 | 0 | 0 |
|  | 5 |  |  |  |  | 0 | 0 | 0 | 0 |
|  | 6 |  |  |  |  |  |  | 0 | 0 |
|  | Q(to) | 2 | 2 | 4 | 4 | 5 | 5 | 6 | 6 |
|  | Q(sl) | 1 | 2 | 1 | 4 | 2 | 5 | 3 | 6 |
|  | Q(prc) | 0.50 | 0.25 | 0.25 | 0.06 | 0.10 | 0.03 | 0.05 | 0.02 |

FIG. 5

|  |  | Option | Correct QO(c) | Total Selections QO(ts) |
|---|---|---|---|---|
| Options | $Q_3O_1$ | Red | 1 | 0 |
|  | $Q_3O_2$ | Green | 0 | 1 |
|  | $Q_3O_3$ | Blue | 0 | 0 |
|  | $Q_3O_4$ | Yellow | 0 | 0 |
|  | $Q_{(to)}$ | 4 |  |  |
|  | $Q_{(sl)}$ | 1 |  |  |
|  | $Q_{(prc)}$ | 0.25 |  |  |
|  | $Q_{(ttc)}$ |  |  | 0 |
|  | $Q_{(tti)}$ |  |  | 1 |

FIG. 6

| UserID | QuestionID | Response Correctness Array | UQ(tti) | UQ(cbi) |
|---|---|---|---|---|
| 1 | 1 | 1,0,1,1 | 1 | 1 |
| 2 | 1 | 0,1,0,1 | 2 | 1 |
| 3 | 1 | 0,0,1,1 | 2 | 0 |
| 4 | 1 | 0,1,1 | 1 | 0 |
| 5 | 1 | 1,0,0,1,1,0,1 | 3 | 3 |

FIG. 7

| Response | Effect on $U_5Q_{1(cbi)}$ |
|---|---|
| Is correct | |
| Is incorrect | +1 |
| Is incorrect | |
| Is correct | |
| Is correct | |
| Is incorrect | +2 |
| Is incorrect | |
| Is correct | |

FIG. 8

|  | Question 1 | Question 2 | Question 3 | Question 4 |
|---|---|---|---|---|
| Respondent 1 | 1,0,1,1 | 1,1 | 1,1 | 0,1,1 |
| Respondent 2 | 0,1,0,1 | 0,1,0,0,1,1 | 0,1 | 0,1,0,1,1 |
| Respondent 3 | 0,0,1,1 | 1,0,1,1 | 0,1,1 | 0,1,1 |
| Respondent 4 | 0,1,1 | 0,1,0,1 | 0,0 | 0,0,1,0,1,1 |
| $Q_{(ttc)}$ | 9 | 10 | 5 | 10 |
| $Q_{(tti)}$ | 6 | 6 | 4 | 7 |
| $Q_{(cbi)}$ | 2 | 3 | 0 | 2 |
| $Q_{(pir)}$ | 0.53 | 0.56 | 0.47 | 0.53 |
| If $Q_{(cbi)}$ were not taken into account, the $Q_{(pir)}$ values would be: | 0.40 | 0.38 | 0.44 | 0.41 |

FIG. 10

| User's Responses to a Question | |
|---|---|
| UQ(rca) | UQ(ctc) |
|  | 0 |
| 0 | -1 |
| 0,0 | -2 |
| 0,0,1 | 1 |
| 0,0,1,0 | -1 |
| 0,0,1,0,1 | 1 |
| 0,0,1,0,1,1 | 2 |
| 0,0,1,0,1,1,1 | 3 |

FIG. 11

| id | UserID | QuestionID | Response Correctness Array | UQ(tti) | UQ(cbi) | UQ(ctc) |
|---|---|---|---|---|---|---|
| 1 | 1 | 1 | 1,0,1,1 | 1 | 1 | 2 |
| 2 | 2 | 1 | 0,1,0,1 | 2 | 1 | 1 |
| 3 | 3 | 1 | 0,0,1,1 | 2 | 0 | 2 |
| 4 | 4 | 1 | 0,1,1 | 1 | 0 | 2 |
| 5 | 5 | 1 | 1,0,0,1,1,0,1 | 3 | 3 | 1 |
| 6 | 6 | 1 | 0,0 | 2 | 0 | -2 |
| 7 | 7 | 1 | 0,1,0 | 2 | 1 | -1 |

| id | UserID | QuestionID | OptionID | Response | Response Correctness | tDisplayed | tResponded |
|---|---|---|---|---|---|---|---|
| 1 | 1 | 9 | 1 | 0 | 0 | 2008-09-10 09:58:37 | 2008-09-10 09:58:49 |
| 5 | 1 | 9 | 1 | 1 | 1 | 2008-09-10 10:15:24 | 2008-09-10 10:15:33 |

FIG. 14

| id | UserID | QuestionID | Seconds to Correct | Seconds to Incorrect |
|---|---|---|---|---|
| 1 | 1 | 9 | Null | 12 |
| 5 | 1 | 9 | 9 | Null |
| 7 | 4 | 9 | Null | 20 |
| 9 | 4 | 9 | 16 | Null |

FIG. 15

| Properties of $Q_9$ | |
|---|---|
| $Q_{(ttc)}$ | 2 |
| $Q_{(tti)}$ | 2 |
| $Q_{(scav)}$ | 12.5 |
| $Q_{(scsd)}$ | 2.86 |
| $Q_{(siav)}$ | 16 |
| $Q_{(sisd)}$ | 3.3 |

FIG. 16

| UQ(sc) | | |
|---|---|---|
| 30 | | |
| 35 | | |
| 2 | | |
| 60 | | |
| 45 | | |
| 10 | | |
| 3 | | |
| 26.428571 | Q(scav) | 2 UQ(sc) |
| 20.611073 | Q(scsd) | |
| -1.185216 | UQ(scse) | 2 UQ(scsdfm) |

|  | | UQ(scsdfm) | | |
|---|---|---|---|---|
| UQ(fpp1) | | 1 | 2 | 3 |
| UQ(ctc) | 4 | 0.00 | 0.00 | 0.00 |
| | 3 | 0.01 | 0.01 | 0.01 |
| | 2 | 0.04 | 0.07 | 0.09 |
| | 1 | 0.17 | 0.29 | 0.38 |

FIG. 19

| id | User | Question | Seconds to Correct $UQ_{(sc)}$ | Seconds to Incorrect $UQ_{(si)}$ | False Positive Probability $UQ_{(fpp)}$ |
|---|---|---|---|---|---|
| 1 | 1 | 9 | Null | 12 | 0.00 |
| 5 | 1 | 9 | 9 | Null | 1.00 |
| 7 | 4 | 9 | Null | 20 | 0.00 |
| 9 | 4 | 9 | 16 | Null | 0.00 |
| 14 | 1 | 9 | Null | 11 | 0.00 |

FIG. 20

|  | U(tgf) | | | | |
|---|---|---|---|---|---|
| UQ(fpp2) | 0.00 | 0.25 | 0.50 | 0.75 | 0.99 |
| UQ(ctc) 5 | 0.00 | 0.00 | 0.00 | 0.00 | 0.00 |
| 4 | 0.00 | 0.00 | 0.00 | 0.00 | 0.00 |
| 3 | 0.00 | 0.00 | 0.00 | 0.01 | 0.01 |
| 2 | 0.00 | 0.02 | 0.03 | 0.05 | 0.06 |
| 1 | 0.00 | 0.06 | 0.13 | 0.19 | 0.25 |

FIG. 21

| Question 12 | Question 13 |
|---|---|
| $\|-2\| + \|2\| = \underline{\quad}$. | $\|-2\| + \|2\| = \underline{\quad}$. |
| a) 0 | a) 0 |
| b) \|4\| | b) \|4\| |
| c) -4 | c) -4 |
| d) \|0\| | d) banana |

FIG. 22

| Question 1 | QO(ts) | Expected percentage of selections QO(eps) | Believability of option relative to other options QO(b) | Distracter Deviation from Expected Percentage of Selections QO(dde) |
|---|---|---|---|---|
| Correct Response 1 | 9 | 0.25 | 0.25 | 0.00 |
| Incorrect Response 1 | 9 | 0.25 | 0.25 | 0.00 |
| Incorrect Response 2 | 9 | 0.25 | 0.25 | 0.00 |
| Incorrect Response 3 | 9 | 0.25 | 0.25 | 0.00 |
| Total Options Q(to) | 4 | | | 0.00 |
| Total Correct Options Q(tco) | 1 | | | Q(dde) |
| Total Incorrect Options Q(tio) | 3 | | | |
| Sum of Correct Responses Q(tcos) | 9 | | | |
| Sum of Incorrect Responses Q(tios) | 27 | | | |
| Total options selected Q(tos) | 36 | | | |
| Expected Correct Q(ec) | 0.25 | | | |
| Q(qod) | 1.00 | | | |

FIG. 23

| Question 4 (Expanded view of operands) | QO(ts) | Expected percentage of selections QO(eps) | Believability of option relative to other options QO(b) | Distracter Deviation from Expected Percentage of Selections QO(dde) |
|---|---|---|---|---|
| Correct Response 1 | 9 | 0.25 | 0.53 | 0.00 |
| Incorrect Response 1 | 2 | 0.25 | 0.12 | 0.13 |
| Incorrect Response 2 | 6 | 0.25 | 0.35 | 0.00 |
| Incorrect Response 3 | 0 | 0.25 | 0.00 | 0.25 |
| Total Options Q(to) | 4 | | | 0.38 |
| Total Correct Options Q(tco) | 1 | | | Q(dde) |
| Total Incorrect Options Q(tio) | 3 | | | |
| Sum of Correct Responses Q(tcos) | 9 | | | |
| Sum of Incorrect Responses Q(tios) | 8 | | | |
| Total options selected Q(tos) | 17 | | | |
| Expected Correct Q(ec) | 0.25 | | | |
| Q(qod) | 0.25 | | | |

FIG. 24

| Question 2 | QO(ts) |
|---|---|
| Correct Response 1 | 9 |
| Incorrect Response 1 | 0 |
| Incorrect Response 2 | 0 |
| Incorrect Response 3 | 0 |
| Q(qod) | 0.00 |
| Question 3 | QO(ts) |
| Correct Response 1 | 9 |
| Incorrect Response 1 | 0 |
| Incorrect Response 2 | 6 |
| Incorrect Response 3 | 0 |
| Q(qod) | 0.03 |
| Question 4 | QO(ts) |
| Correct Response 1 | 9 |
| Incorrect Response 1 | 2 |
| Incorrect Response 2 | 6 |
| Incorrect Response 3 | 0 |
| Q(qod) | 0.25 |
| Question 5 | QO(ts) |
| Correct Response 1 | 9 |
| Incorrect Response 1 | 2 |
| Incorrect Response 2 | 6 |
| Incorrect Response 3 | 1 |
| Q(qod) | 0.33 |
| Question 6 | QO(ts) |
| Correct Response 1 | 9 |
| Incorrect Response 1 | 3 |
| Incorrect Response 2 | 3 |
| Incorrect Response 3 | 3 |
| Q(qod) | 0.42 |

FIG. 25A

| Question 7 | QO(ts) |
|---|---|
| Correct Response 1 | 9 |
| Incorrect Response 1 | 3 |
| Incorrect Response 2 | 9 |
| Incorrect Response 3 | 3 |
| Q(qod) | 0.58 |
| Question 8 | QO(ts) |
| Correct Response 1 | 9 |
| Incorrect Response 1 | 5 |
| Incorrect Response 2 | 9 |
| Incorrect Response 3 | 4 |
| Q(qod) | 0.72 |
| Question 9 | QO(ts) |
| Correct Response 1 | 9 |
| Incorrect Response 1 | 8 |
| Incorrect Response 2 | 9 |
| Incorrect Response 3 | 7 |
| Q(qod) | 0.92 |
| Question 10 | QO(ts) |
| Correct Response 1 | 9 |
| Incorrect Response 1 | 9 |
| Incorrect Response 2 | 18 |
| Incorrect Response 3 | 9 |
| Q(qod) | 0.90 |
| Question 11 | QO(ts) |
| Correct Response 1 | 9 |
| Incorrect Response 1 | 4 |
| Incorrect Response 2 | 18 |
| Incorrect Response 3 | 5 |
| Q(qod) | 0.75 |

FIG. 25B

|  | | Q(qod) | | | | | | | | |
|---|---|---|---|---|---|---|---|---|---|---|
| | Q(fpo) | 0.00 | 0.01 | 0.25 | 0.33 | 0.42 | 0.58 | 0.72 | 0.92 | 1.00 |
| Q(prc) | 0.01 | 0.99 | 0.99 | 0.04 | 0.03 | 0.02 | 0.02 | 0.01 | 0.01 | 0.01 |
| | 0.1 | 0.99 | 0.99 | 0.40 | 0.30 | 0.24 | 0.17 | 0.14 | 0.11 | 0.10 |
| | 0.2 | 0.99 | 0.99 | 0.80 | 0.61 | 0.48 | 0.34 | 0.28 | 0.22 | 0.20 |
| | 0.25 | 0.99 | 0.99 | 0.99 | 0.76 | 0.60 | 0.43 | 0.35 | 0.27 | 0.25 |
| | 0.33 | 0.99 | 0.99 | 0.99 | 0.99 | 0.79 | 0.57 | 0.46 | 0.36 | 0.33 |
| | 0.5 | 0.99 | 0.99 | 0.99 | 0.99 | 0.99 | 0.86 | 0.69 | 0.54 | 0.50 |

FIG. 27

|  | | U(tgf) | | | | |
|---|---|---|---|---|---|---|
| | UQ(fpp2) | 0.00 | 0.25 | 0.50 | 0.75 | 0.99 |
| UQ(ctc) | 5 | 0.00 | 0.00 | 0.00 | 0.00 | 0.00 |
| | 4 | 0.00 | 0.00 | 0.00 | 0.00 | 0.00 |
| | 3 | 0.00 | 0.00 | 0.00 | 0.01 | 0.01 |
| | 2 | 0.00 | 0.02 | 0.03 | 0.05 | 0.06 |
| | 1 | 0.00 | 0.06 | 0.13 | 0.19 | 0.25 |

FIG. 28

| $UQ_{(cw)}$ | Not at all certain | | $UQ_{(c)}$ | Certainty Threshold $\left(U_{(ct)}\right)$ | | | Absolutely certain |
|---|---|---|---|---|---|---|---|
| UQ(ctc) | 0 | 0.1 | 0.5 | 0.75 | 0.8 | 0.85 | 0.9 | 1 |
| 5 | 12.80 | 11.20 | 4.80 | 0.80 | 0.00 | -8.00 | -16.00 | -32.00 |
| 4 | 5.12 | 4.48 | 1.92 | 0.32 | 0.00 | -3.20 | -6.40 | -12.80 |
| 3 | 1.92 | 1.68 | 0.72 | 0.12 | 0.00 | -1.20 | -2.40 | -4.80 |
| 2 | 0.64 | 0.56 | 0.24 | 0.04 | 0.00 | -0.40 | -0.80 | -1.60 |
| 1 | 0.16 | 0.14 | 0.06 | 0.01 | 0.00 | -0.10 | -0.20 | -0.40 |
| -1 | 0.20 | 0.30 | 0.70 | 0.95 | 1.00 | 2.60 | 3.20 | 4.40 |
| -2 | 0.80 | 0.90 | 1.30 | 1.55 | 1.60 | 3.80 | 4.40 | 5.60 |
| -3 | 2.40 | 2.50 | 2.90 | 3.15 | 3.20 | 7.00 | 7.60 | 8.80 |
| -4 | 6.40 | 6.50 | 6.90 | 7.15 | 7.20 | 15.00 | 15.60 | 16.80 |
| -5 | 16.00 | 16.10 | 16.50 | 16.75 | 16.80 | 34.20 | 34.80 | 36.00 |

FIG. 31

| $UQ_{(cw)}$ | Not at all certain | | Certainty Threshold $\left(U_{(ct)}\right)$ | | $UQ_{(c)}$ | | | Absolutely certain |
|---|---|---|---|---|---|---|---|---|
| UQ(ctc) | 0 | 0.1 | .05 | .075 | 0.8 | 0.85 | 0.9 | 1 |
| 5 | 8.00 | 6.40 | 0.00 | -40.00 | -48.00 | -56.00 | -64.00 | -80.00 |
| 4 | 3.20 | 2.56 | 0.00 | -16.00 | -19.20 | -22.40 | -25.60 | -32.00 |
| 3 | 1.20 | 0.96 | 0.00 | -6.00 | -7.20 | -8.40 | -9.60 | -12.00 |
| 2 | 0.40 | 0.32 | 0.00 | -2.00 | -2.40 | -2.80 | -3.20 | -4.00 |
| 1 | 0.10 | 0.08 | 0.00 | -0.50 | -0.60 | -0.70 | -0.80 | -1.00 |
| -1 | 0.20 | 0.30 | 0.70 | 4.40 | 5.00 | 5.60 | 6.20 | 7.40 |
| -2 | 0.80 | 0.90 | 1.30 | 5.60 | 6.20 | 6.80 | 7.40 | 8.60 |
| -3 | 2.40 | 2.50 | 2.90 | 8.80 | 9.40 | 10.00 | 10.60 | 11.80 |
| -4 | 6.40 | 6.50 | 6.90 | 16.80 | 17.40 | 18.00 | 18.60 | 19.80 |
| -5 | 16.00 | 16.10 | 16.50 | 36.00 | 36.60 | 37.20 | 37.80 | 39.00 |

FIG. 32

| Properties of Question 7 and Its Options | Option | Correct | Total Selections QO(ts) |
|---|---|---|---|
| $Q_7O_1$ | gato | 1 | 0 |
| $Q_{(to)}$ | 0 | | |
| $Q_{(sl)}$ | 0 | | |
| $Q_{(prc)}$ | 0.25 | | |
| $Q_{(ttc)}$ | | | 0 |
| $Q_{(tti)}$ | | | 1 |
| $Q_{(cbi)}$ | | | 0 |
| $Q_{(pir)}$ | | | 1.00 |

FIG. 38

| id | UserID | QuestionID | OptionID | Response UQO(r) | Response Correctness UQO(rc) |
|---|---|---|---|---|---|
| 1 | 1 | 3 | 58 | 0 | 0 |
| 2 | 1 | 3 | 59 | 1 | 0 |
| 3 | 1 | 3 | 60 | 0 | 1 |
| 4 | 1 | 3 | 61 | 0 | 1 |

FIG. 39

| id | UserID | QuestionID | OptionID | Response UQO(r) | Response Correctness UQO(rc) |
|---|---|---|---|---|---|
| 5 | 1 | 3 | 58 | 0 | 0 |
| 6 | 1 | 3 | 59 | 0 | 1 |
| 7 | 1 | 3 | 60 | 1 | 0 |
| 8 | 1 | 3 | 61 | 0 | 1 |

FIG. 40

| id | UserID | QuestionID | OptionID | Response UQO(r) | Response Correctness UQO(rc) |
|---|---|---|---|---|---|
| 9 | 1 | 8 | 1 | gato | 1 |
| 10 | 2 | 8 | 1 | cato | 0 |

FIG. 41

| Certainty Mode ☑ | If checked, certainty mode interface and calculations will be enabled. |
|---|---|
| Default Certainty Threshold [90] % | When running in certainty mode, S(ct) is a value for a degree of certainty (e.g. 90%) below which any correct response by any user is treated as a false positive. |
| ☑ Q(cbi) | Question: Correct Before Incorrect |
| ☑ Q(dde) | Question: Distracter Deviation from Expected Percentage of Selections |
| ☑ Q(ec) | Question: Expected Correct |
| ☑ Q(pir) | Question: Percentage of Incorrect Responses |
| ☑ Q(prc) | Question: Percent Random Chance |
| ☑ Q(qod) | Question: Quality of Distracters |
| ☑ Q(sc) | Question: Seconds to Correct |
| ☑ Q(scav) | Question: Seconds to Correct Average |
| ☑ Q(scsd) | Question: Seconds to Correct Standard Deviation |
| ☑ Q(si) | Question: Seconds to Incorrect |
| ☑ Q(siav) | Question: Seconds to Incorrect Average |
| ☑ Q(sisd) | Question: Seconds to Incorrect Standard Deviation |
| ☑ Q(sl) | Question: Selection Limit |
| ☑ Q(tco) | Question: Total Correct Options |
| ☑ Q(tcos) | Question: Total Correct Options Selected |
| ☑ Q(tio) | Question: Total Incorrect Option |
| ☑ Q(tios) | Question: Total Incorrect Options Selected |
| ☑ Q(to) | Question: Total Options |
| ☑ Q(tos) | Question: Total Options Selected |
| ☑ Q(ttc) | Question: Total Times Correct |
| ☑ Q(tti) | Question: Total Times Incorrect |
| ☑ QO(b) | Question-Option: Believability |
| ☑ QO(c) | Question-Option: Correct |
| ☑ QO(dde) | Question-Option: Distracter Deviation from Expected Percentage of Selections |
| ☑ QO(eps) | Question-Option: Expected Percentage of Selections |
| ☑ QO(ts) | Question-Option: Times Selected |
| ☑ S(ct) | System: Certainty Threshold |

FIG. 42-A

| ☑ | QO(eps) | Question-Option: Expected Percentage of Selections |
|---|---|---|
| ☑ | QO(ts) | Question-Option: Times Selected |
| ☑ | S(ct) | System: Certainty Threshold |
| ☑ | U(ct) | User: Certainty Threshold |
| ☑ | U(gfc) | User: Guess/Forget Count |
| ☑ | U(tgf) | User: Tendency to Guess or Forget |
| ☑ | U(tqa) | User: Total Questions asked |
| ☑ | UQ(c) | User-Question: Certainty |
| ☑ | UQ(cr) | User-Question: Correctness |
| ☑ | UQ(cbi) | User-Question: Correct Before Incorrect |
| ☑ | UQ(ctc) | User-Question: Consecutive Times Correct |
| ☑ | UQ(cw) | User-Question: Certainty Weight |
| ☑ | UQ(dt) | User-Question: Display Time |
| ☑ | UQ(fpp) | User-Question: False Positive Probability |
| ☑ | UQ(rca) | User-Question: Response Correctness Array |
| ☑ | UQ(rt) | User-Question: Response Time |
| ☑ | UQ(sc) | User-Question: Seconds to Correct |
| ☑ | UQ(scsdfm) | User-Question: Seconds to Correct, Standard Deviations from the Mean |
| ☑ | UQ(scse) | User-Question: Seconds to Correct, Normalized Value |
| ☑ | UQ(si) | User-Question: Seconds to Incorrect |
| ☑ | UQ(sw) | User-Question: Recommended Stacking Weight |
| ☑ | UQ(ttc) | User-Question: Total Times Correct |
| ☑ | UQ(tti) | User-Question: Total Times Incorrect |
| ☑ | UQO(r) | User-Question-Option: Response |
| ☑ | UQO(rc) | User-Question-Option: Response Correctness |
| ☑ | UX(crsr) | User (Course-Lesson-Module) Correct Responses Since Remediation |
| ☑ | UX(irsr) | User (Course-Lesson-Module) Incorrect Responses Since Remediation |

FIG. 42-B

ASSESSMENT-DRIVEN COGNITION SYSTEM

CROSS-REFERENCE TO RELATED APPLICATION

The present application claims priority under 35 U.S.C. §119(e) to provisional application No. 61/037,648 filed on Mar. 18, 2008, the entire contents of which are incorporated herein by reference.

TECHNICAL FIELD

The present invention relates to iterative learning and assessment tools (hereinafter "ILATs"). ILATs develop and assess a learner's knowledge by iterative means of evaluating the learner's responses to questions and determining whether and when any questions will be asked again to the learner.

BACKGROUND

ILATs provide learners the opportunity to assess their knowledge and improve their skills. Examples of learners who use ILATs include, but are not limited to, students at universities and employees at a company. ILATs operate to select the next question (or set of questions, or instructional content block) to display to the learner.

However, current ILATs are limited in the ability to assess if the learner selects a correct response to a question without knowledge that the response is correct.

SUMMARY

Embodiments of the present invention calculate a set of values for an ILAT to help the ILAT determine which question, question set, or instructional content to present next to a user (e.g., learner). Embodiments of the invention may be employed by new or existing assessment tools to help them determine a course of action resulting from the user's response to a problem. In general, it is contemplated that various embodiments of the present invention include assessment tools working with existing ILATs and new ILATs containing new, integral functionalities.

Embodiments use a collection of operands to determine a likelihood that the user's correct response to a question is a false positive. For example, one or more operands may indicate a percent chance that the user randomly selects the correct response to the question. In addition, one or more operands may indicate how many times the user responds to the question incorrectly after answering the question correctly, how many consecutive times the question is answered correctly or incorrectly, and/or how quickly the user correctly responds to the question compared to other user responses to the question. Further, one or more operands may indicate the likelihood of selecting one or more incorrect options to the question.

Embodiments accept the user's response to a question, use that response and operands discussed above to determine a set of values including the likelihood that the user's correct response is a false positive. Those values can then be used to determine which question to present next.

In embodiments, a computer-based system for assessment driven learning includes a generator configured to present questions received from a processor to a question presentation device utilizing a question module and a question database having a plurality of questions. The plurality of questions are associated with a stacking weight and are ordered according to the stacking weight of each question. Each question presented includes at least one answer option and at least one associated correct response. The computer-based system includes a question property evaluator configured to utilize the question module to determine a likelihood of randomly selecting the at least one associated correct response. The question property evaluator considers, for each question presented, at least the number of answer options and a number of answer options a user is instructed to select. The computer-based system includes a question response receiver configured to receive, from a device associated with the user, at least one response to each question presented utilizing a communications module. The system further includes a question response evaluator configured to, utilizing an evaluation module and a user response history database for each question presented, determine, when the at least one response is the at least one associated correct response, a likelihood that the at least one response is a false positive using the question property evaluator, a response history of the user, and a response history of one or more other users. The question response evaluator is further configured to adjust the stacking weight of each question presented within the question database depending at least upon the likelihood that the at least one response to the question is a false positive.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 5 illustrates an example set of questions;

FIG. 6 illustrates example properties of a question;

FIG. 7 illustrates users' histories of responding to a question;

FIG. 8 illustrates how each response by a user affects $U_{(cbi)}$;

FIG. 10 illustrates example response histories and a corresponding $Q_{(cbi)}$; $Q_{(pir)}$;

FIG. 11 illustrates how $UQ_{(rca)}$ correlates with $UQ_{(ctc)}$;

FIG. 14 illustrates when an option for a question is displayed and when a user responds to the question;

FIG. 15 illustrates how long it took for a user to respond to a question correctly or incorrectly;

FIG. 16 illustrates an example property list for a question;

FIG. 19 illustrates a chart for $UQ_{(fpp1)}$ with corresponding $UQ_{(scsdfm)}$ and $UQ_{(ctc)}$ values;

FIG. 20 illustrates how a correct response is flagged as a false positive after a question is answered incorrectly;

FIG. 21 illustrates a chart for $UQ_{(fpp2)}$ with corresponding $UQ_{(tgf)}$ and $UQ_{(ctc)}$ values;

FIG. 22 illustrates two example mathematical questions;

FIG. 23 illustrates a question with corresponding answer options and a corresponding $Q_{(qod)}$;

FIG. 24 illustrates how the value of $Q_{(qod)}$ changes as the distribution of answer option selections varies;

FIGS. 25A and 25B illustrate how changes in values of operands used in the $Q_{(qod)}$ equation for a question affect $Q_{(qod)}$;

FIG. 27 illustrates an example chart for $Q_{(fpo)}$ with corresponding $Q_{(qod)}$ and $Q_{(pre)}$ values;

FIG. 28 illustrates an example chart for $UQ_{(fpp3)}$ with corresponding $Q_{(fpo)}$ and $UQ_{(ctc)}$ values;

FIG. 31 illustrates a chart for $UQ_{(cw)}$ with corresponding $UQ_{(c)}$ and $UQ_{(ctc)}$ values with $U_{(ct)}$ set to 80%;

FIG. 32 illustrates a chart for $UQ_{(cw)}$ with corresponding $UQ_{(c)}$ and $UQ_{(ctc)}$ values with $U_{(ct)}$ set to 50%;

FIG. 38 illustrates an example properties list for a question;

FIG. 39 illustrates an example set of data of a user's response to a question;

FIG. 40 illustrates another example set of data of a user's response to a question;

FIG. 41 illustrates another set of example data of a user's response to a question;

FIGS. 42A to 42B illustrate a control panel that permits an administrator to select operands;

DETAILED DESCRIPTION

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

In embodiments, the terms user, learner, and respondent are used interchangeably.

ILATs provide questions to users and evaluate responses to the questions to determine if and when a user will see the question again. In embodiments, questions presented to a user are displayed in an interface. In other (or overlapping) embodiments, questions presented to a user are physical flashcards that the user may physically re-order or move.

Figure 1:
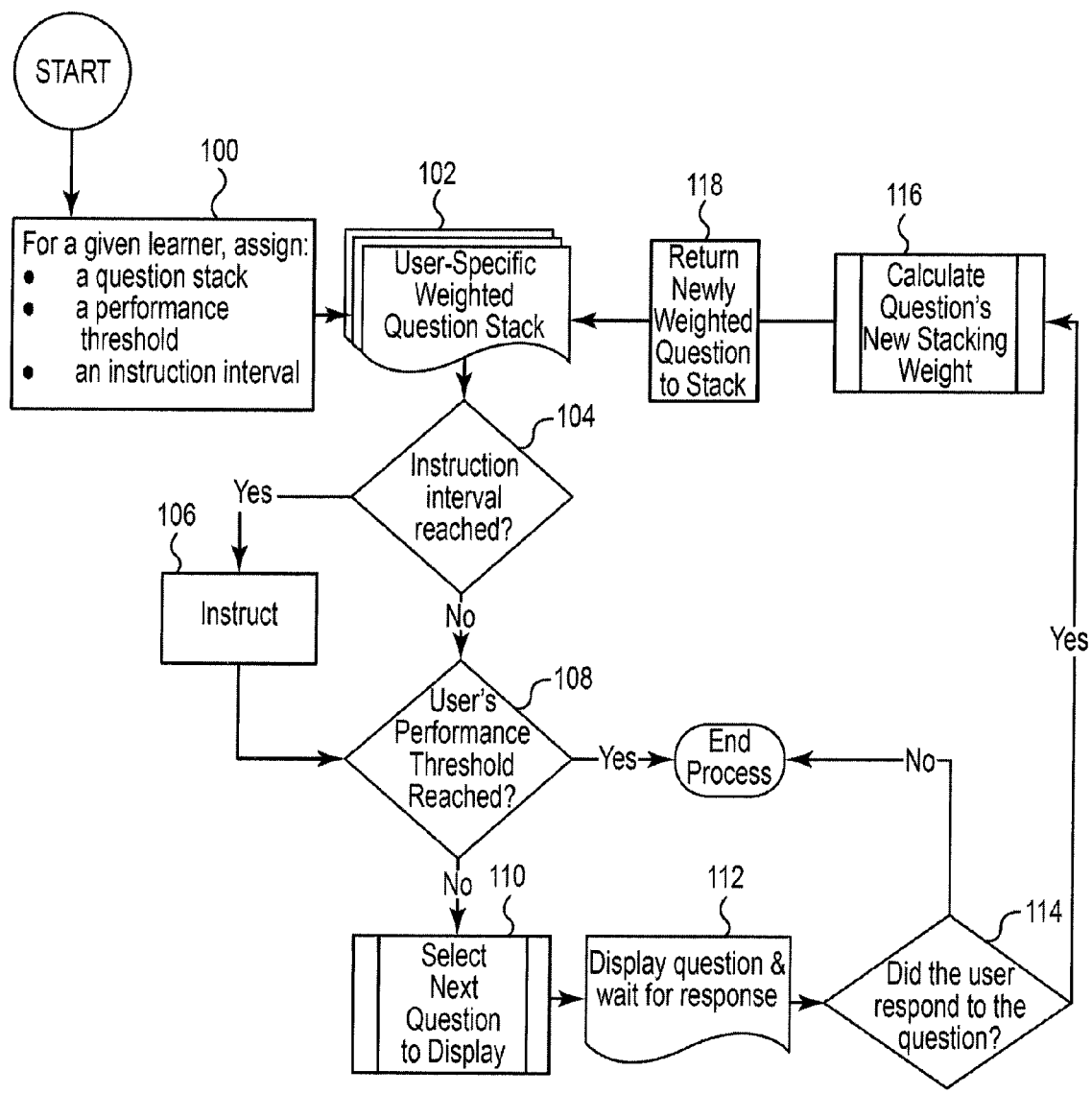
FIG. 1 illustrates an example ILAT process.

FIG. 1 illustrates an example ILAT process. In embodiments, the process starts at 100 where for a given user, a question stack, a performance threshold, and an instruction interval for the user can be assigned. In embodiments, a question stack can be a subset of one or more questions selected from a plurality of questions. An example instruction interval includes, but is not limited to, a specified number of questions presented to the user. An example performance threshold includes, but is not limited to, a percentage of questions the user is required to answer correctly before completing the instruction interval.

ILAT process flow proceeds from 100 to 102 where a user receives a user-specific weighted question stack. In embodiments, a user-specific weighted question stack can be an ordered question stack where each question in the question stack can be associated with a weight value. As an example, a question with the lowest weight value compared to the weight values of the other questions in the question stack can be ordered at the top of the question stack. The ILAT process flow proceeds from 102 to 104 to determine if the instruction interval is reached. As an example, an instruction interval may specify that a user is not suppose to answer more than 100 questions. Accordingly, when the user answers the 100th question, the instruction interval is reached. If the instruction interval is reached, the ILAT process flow proceeds from 104 to 106 to instruct the user. An ILAT may provide a report indicating which questions were answered correctly to instruct the user on the areas the user needs to improve.

If the instruction interval is not reached, the ILAT process flow proceeds from 104 to 108 to determine if the user's performance threshold is reached. As an example, if the performance threshold is set to 50%, and the user has already answered 10 questions, the performance threshold is reached when the user has answered 5 questions correctly. If the user's performance threshold is reached, the ILAT process ends. If the user's performance threshold 108 is not reached, the ILAT process flow proceeds from 108 to 110 to select the next question to display to the user. As an example, the question at the top of the stack (e.g., the question with the lowest weight value) is selected to display to the user.

The ILAT process flow proceeds from 110 to 112 where the question is displayed to a user and the ILAT waits for the user response. In embodiments, questions are displayed to the user using any desired format. For example, if the user belongs to a university, the format of the question display may include colors and logos associated with the university. ILAT process flow proceeds from 112 to 114 to determine if the user responded to the displayed question. If the user did not respond to the displayed question, the ILAT process ends. As an example, the ILAT process may time out after not receiving a response for a predetermined period of time.

If the user responded to the displayed question, the ILAT process flow proceeds from 114 to 116 to calculate the displayed question's new stacking weight. The ILAT process flow proceeds from 116 to 118 to return the newly weighted question to the question stack. As an example, when the question's new stacking weight is calculated, the question can be reordered in the question stack according to the new stacking weight. The ILAT process flow returns from 118 to 102 where the process described above for 102 is repeated.

ILATs that implement the process illustrated in FIG. 1 may evaluate whether a response is correct or incorrect in determining the ILAT's next course of action. Embodiments operate on the assertion that it is insufficient to simply evaluate whether a response to a question is right or wrong for all questions in the stack. Consider, for example, an ILAT in which questions are always presented with a single correct response option and two incorrect response options (i.e. distracters). Without considering the actual content of the response options, the possibility of selecting the one correct response by random chance is always 33%. In embodiments, the percent random chance of selecting a correct response to a question as a variable is referred to as $Q_{(prc)}$. If the learner can determine that one of the two distracters is incorrect, then the question's $Q_{(prc)}$ rises to 50%.

With a 33% chance of randomly selecting the correct answer, and certainly with a 50% chance, the odds are too high that a correct response may not be a true reflection of the learner's knowledge of the question content. A correct response to a question that does not reflect the learner's true knowledge is referred to as a false positive. Embodiments apply various techniques to identify false positives. These techniques can be used by an ILAT to help the ILAT determine whether and when to re-present a question to a learner. Embodiments calculate and use the $Q_{(prc)}$ variable in evaluating the likelihood of a false positive.

Embodiments make use of a learner's reported level of certainty in the learner's response to a question to determine if a correct response to a question is a false positive. As an example, if a learner reports a low level of certainty while responding to the question correctly, then the correct response is treated as a false positive. In addition to using the learner's reported level of certainty, embodiments use another variable referred to as a Certainty Threshold. As an example, if the level of reported certainty (which can vary from one embodiment to another) is below the Certainty Threshold, any correct response is regarded as a false positive. Embodiments can be run in Certainty Mode. When run in Certainty Mode, the embodiment asks the learner to report his level of certainty. When not run in Certainty Mode, the learner is not asked to report on his level of certainty.

Embodiments use a variable $UQ_{(fpp)}$ to represent a likelihood that a response to a question is a false positive. As an example, $UQ_{(fpp)}$ can be associated with a scale of 0 to 1 to indicate a response's probability of being a false positive where a definite false positive has a $UQ_{(fpp)}$ equal to 1. In embodiments, an incorrect response always has a $UQ_{(fpp)}$ equal to 0 since an incorrect response cannot be a false positive. A $UQ_{(fpp)}$ greater than 0 and less than 1 correlates to the probability that a correct response is actually a false positive (e.g., the learner responded to the question correctly without knowledge of the question's correct answer). In embodiments, this probability is not calculated from a learner's reported level of certainty, but rather can be calculated from other variables including at least $Q_{(prc)}$.

Embodiments use a variable $UQ_{(ctc)}$ to represent the number of consecutive correct responses or consecutive incorrect responses by a learner to a specific question that have occurred most recently in the learner's history of responses to the question. The $UQ_{(ctc)}$ variable increases or decreases the stacking weight of a question. A question's stacking weight can be represented by the variable $UQ_{(sw)}$, where a low stacking weight may represent the likelihood that a question will be re-presented to the learner sooner compared to a high stacking weight. An ILAT may convert a low stacking weight to a high stacking weight, and vice versa, depending on how the ILAT chooses to use the stacking weight. If the user consistently answers a question incorrectly, $UQ_{(ctc)}$ has a negative value and the question's stacking weight may decrease since the user needs to see the question again soon. If the user consistently answers a question correctly, $UQ_{(ctc)}$ has a positive value and the question's stacking weight may increase since the user does not need to see the question again soon. The ILAT may use $UQ_{(ctc)}$ as the sole operand in calculating $UQ_{(sw)}$ for an incorrect response to a question. In another example, for a correct response to a question, the ILAT may calculate $UQ_{(sw)}$ using $UQ_{(ctc)}$ and $Q_{(prc)}$. Accordingly, in embodiments, the ILAT has discretion over which operands to use in determining if a question is presented again sooner or later.

In embodiments, any mechanism or device configured to determine one or more operands to determine $UQ_{(fpp)}$ and/or $UQ_{(sw)}$ may be located external to the ILAT. In other (or overlapping) embodiments, any mechanism or device configured to determine one or more operands to determine $UQ_{(fpp)}$ and/or $UQ_{(sw)}$ may be incorporated as part of the ILAT itself. Accordingly, any embodiment describing returning values to an ILAT may include any mechanism or device located externally to the ILAT or as part of the ILAT itself.

Figure 2:
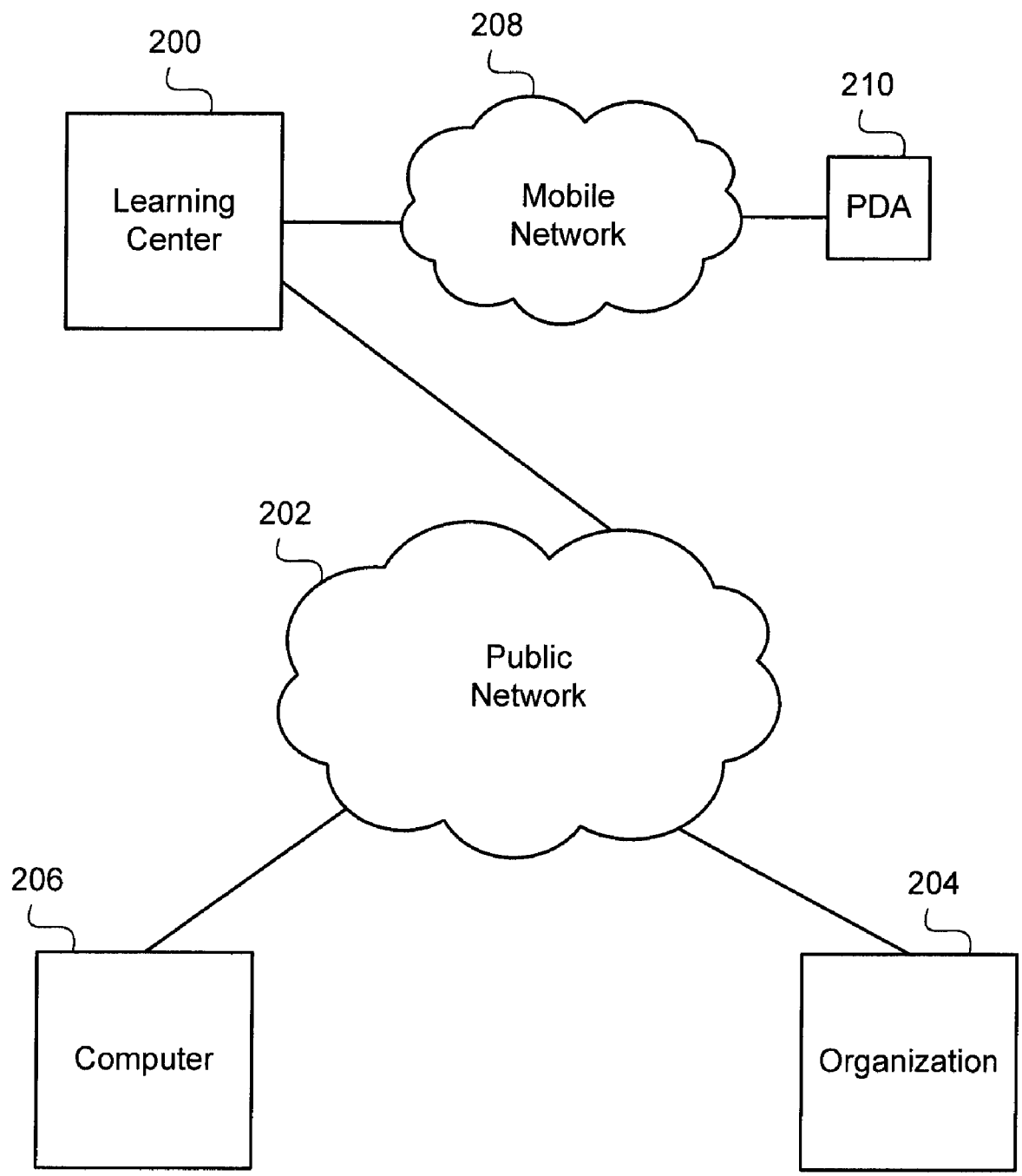
FIG. 2 illustrates an example configuration between a learning center, an organization, a computer, and a personal digital assistant.

In embodiments, questions are presented to users via an online system. FIG. 2 illustrates an example configuration between a learning center 200, an organization 204, a computer 206, and a personal digital assistant (PDA) 210. In embodiments, the learning center includes one or more servers that performs the ILAT process illustrated in FIG. 1. For example, the organization 204 can be any school, university, or company, and the computer 206 can be any desired computing device such as, but not limited to, a personal desktop located at a residential address. In addition, the PDA can be any desired digital assistant such as a Blackberry.

In embodiments, the learning center 200 communicates with the organization 204 and computer 206 over a public network such as the Internet. As an illustrative example, the organization 204 can be a university where students at the university may register for courses requiring students to take online tests. Accordingly, when students are taking online tests at the university, one or more questions may be downloaded from the learning center 200 to a terminal located at the university over the public network 202. In another example, if students are permitted to take online tests while at home, students may download one or more questions from the learning center 200 to their home computer 206 over the public network 202. In yet another example, students may be permitted to take online tests associated with their courses using their own PDA. For example, a student may download one or more questions from the learning center 200 to their PDA 210 over a mobile network 208.

Figure 3:
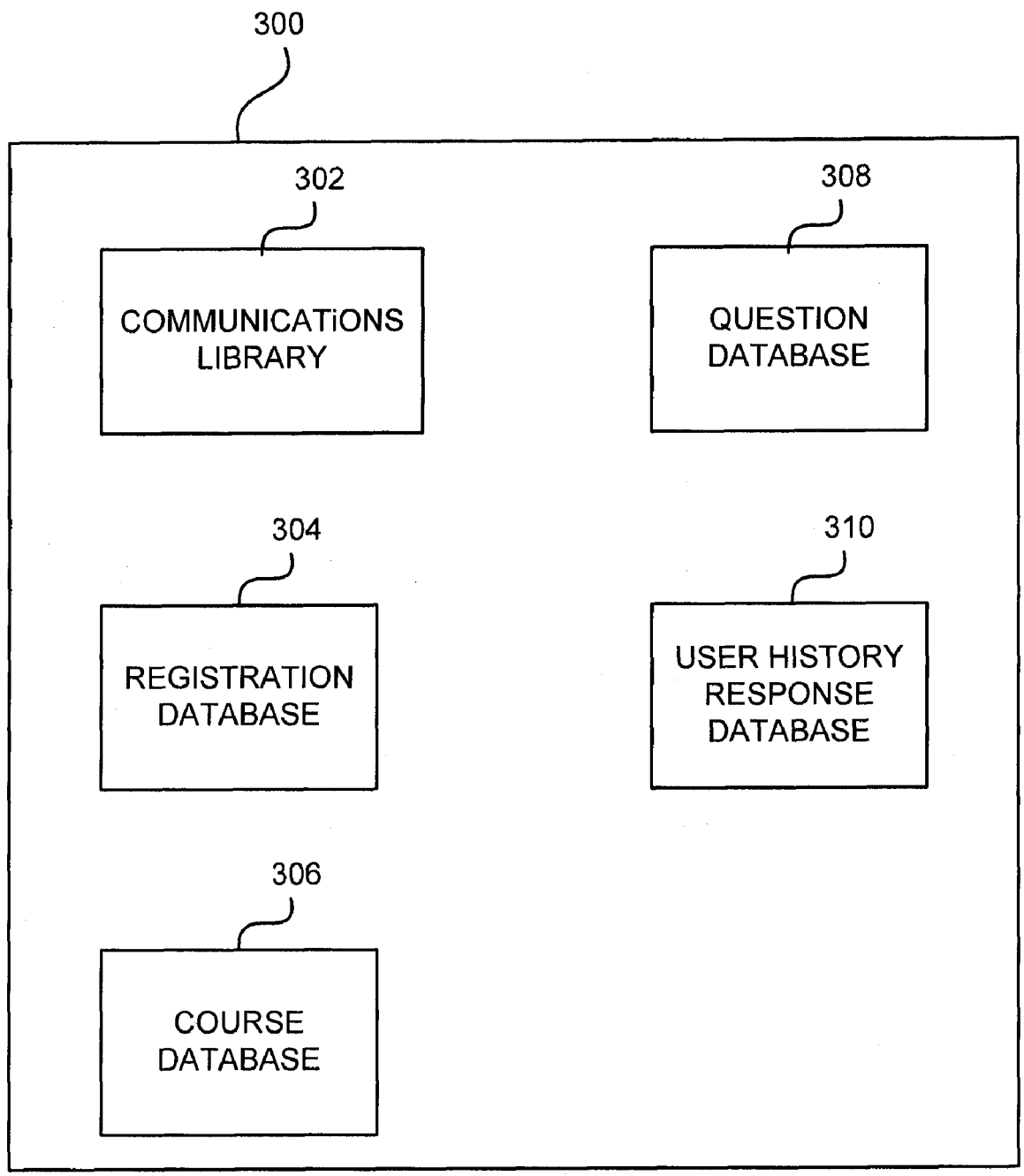
FIG. 3 illustrates an example system including one or more libraries and one or more databases.

FIG. 3 illustrates an example system 300 including one or more libraries and one or more databases. As an example, the system 300 is incorporated in the learning center 200 (FIG. 2), though aspects of system 300 can also be incorporated into other portions of the present invention. In embodiments, the system 300 includes a communications library 302, a registration database 304, a course database 306, a questions database 308, and a user history response database 310.

In embodiments, the communications library 302 contains information for communicating with a network using any desired network protocol. As an example, if a network is using the Global System for Mobile (GSM) communications protocol, the communications library 302 can include all information used for communicating with that particular network using the GSM protocol. If a network is using the IP protocol, the communications library 302 includes all information used for communication with that particular network using the IP protocol.

In embodiments, the registration database 304 can include registration profiles of users who register for online courses. For example, a registration profile for a particular user may indicate each course that a user is taking. In embodiments, the course database 306 can include information associated with courses provided by the learning center 200. The course database 306 may include display formats for each course. For example, if a course is offered for a particular university, a display format for that course may include colors and logos associated with the university. The course database 306 may also include schedules for each course. As an example, a schedule associated with a course may indicate what day of the week the course is offered and when tests for the course are provided.

In embodiments, the questions database 308 stores each question provided by the learning center 200 (FIG. 2) and the properties of each question. As an example, a property of a question includes, but is not limited to, the total number of times the question has been answered, the total number of times the question has been answered correctly, and the total number of times the question has been answered incorrectly. Each question stored in the database may include at least one answer options and at least one associated correct response. In other (or overlapping) embodiments, the questions database 308 only stores the properties of each question instead of the actual questions.

In embodiments, the user history response database 310 stores a response history for each user. As an example, a response history for a particular question may indicate when the user answered the question correctly and when the user answered the question incorrectly.

The term "module" refers broadly to a software, hardware, or firmware component (or any combination thereof). Modules are typically functional components that can generate useful data or other output using specified input(s). A module may or may not be self-contained. An application program (also called an "application") may include one or more modules, and/or a module can include one or more application programs.

Figure 4:
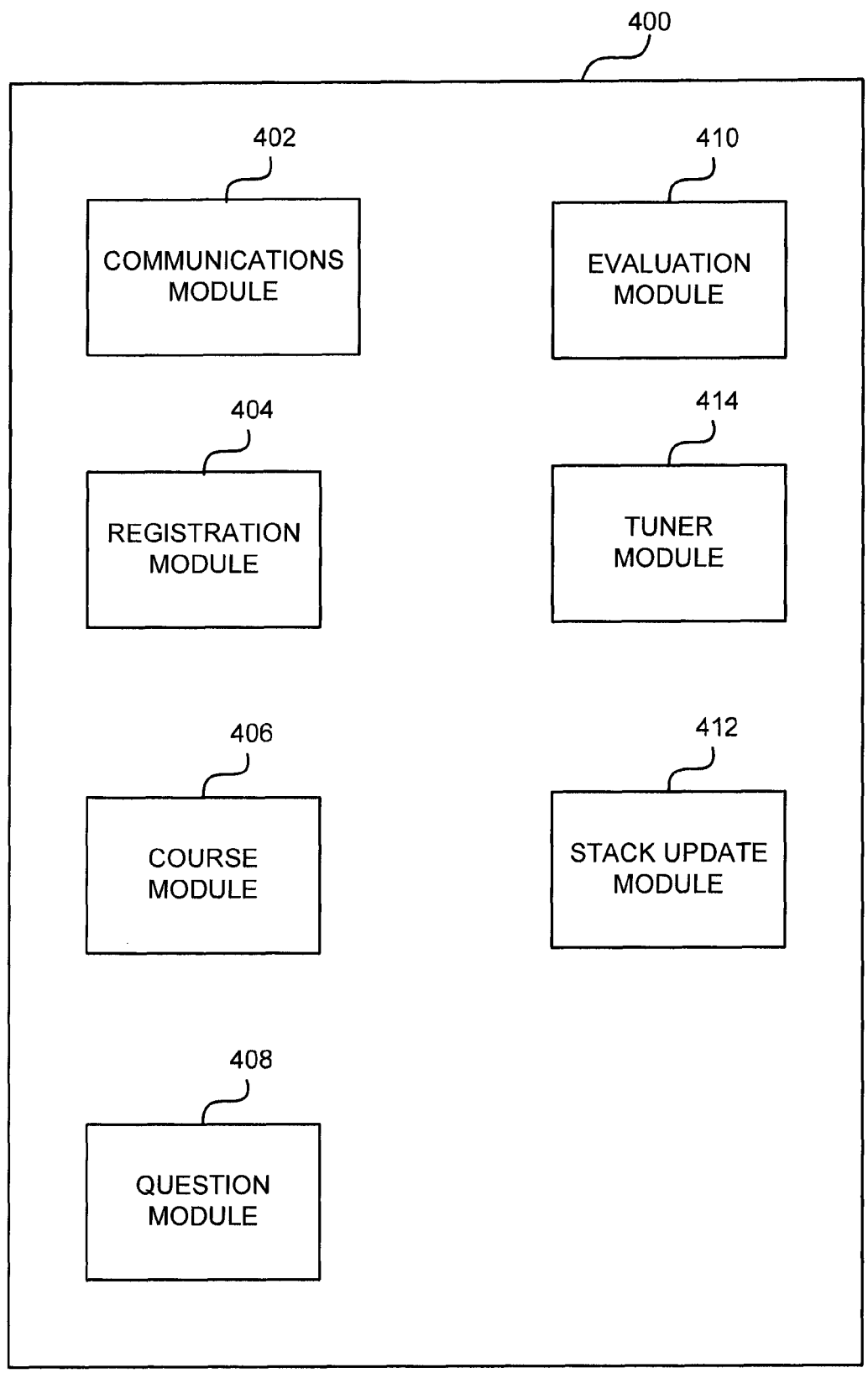
FIG. 4 illustrates an example system including one or more modules.

FIG. 4 illustrates an example system 400 including one or more modules. The system 400 may be incorporated into the learning center 200 (FIG. 2), though aspects of system 400 can also be incorporated into other portions of the present invention. In embodiments, the system 400 includes a communications module 402, a registration module 404, a course module 406, a question module 408, an evaluation module 410, a stack update module 412, and a tuner module 414.

In embodiments, the communications module 402 may be configured to communicate with each network and/or device in communication with the learning center 200 (FIG. 2). As an example, if the learning system 300 is in communication with a device over a network using the IP protocol, the communications module 402 accesses the communications library 302 (FIG. 3) to determine how to send and receive data using the IP protocol. Accordingly, the communications module can utilize the communications library 302 (FIG. 3) to send and receive data using any number of desired communication protocols. In embodiments, the communications module 402 operates as a question response receiver.

In embodiments, the registration module 404 may perform a registration process to register users for courses. As an example, when a user registers for a course, the registration module 404 creates a registration profile for that user and stores the profile in the registration database 304. In embodiments, the course module 406 executes the courses for each registered user. For example, when a course is scheduled to be provided to users on a particular day, the course module 406 retrieves information associated with the course from the course database 306 and provides the course to the registered users. As another example, when a test associated with the course is scheduled to be provided on a particular day, the course module 406 retrieves the questions associated with the test from the question database 308 and provides the test to the users.

In embodiments, the question module 408 displays questions to users, receives responses from the users, updates the question properties of the question, and updates the user's response history. For example, upon receiving a response from the user, the question module 408 updates the properties for the question, such as the total number of times a question is answered, and stores the updated properties in the question database 308 (FIG. 3). As another example, upon receiving a response from the user, the question module 408 updates the user response history, such as whether the current response is correct, and stores the updated user response history in the user history response database 310. In embodiments, a generator (also called) a "question generator" utilizes the question module 408 and the question database 308 to present questions to a question presentation device. In some embodiments, the question generator and question module are one and the same. In embodiments, a question presentation device can be any desired device suitable for presenting one or more questions to a user. Examples of question presentation devices include, but are not limited to, LCD display screens or any audio system configured to play an audio file containing the question to a user and receive a voice response from the user. In further embodiments, a question property evaluator utilizes the question module 408 to determine one or more properties associated with a question.

In embodiments, the evaluation module 410 receives a response to a question from the question module 408 and determines a likelihood that the response is a false positive ($UQ_{(fpp)}$) and a new stacking weight ($UQ_{(sw)}$) for the question using one or more operands such as a user's reported level of certainty and/or $UQ_{(fpp)}$. In embodiments, a question response evaluator can utilize the evaluation module 410 (or is the evaluation module 410) to determine one or more operands associated with a user's response to a question. In embodiments, the stack update module 412 updates a question stack using the results of the evaluation module 410. In embodiments, the tuner module 414 permits adjustment of one or more operands used by the evaluation module 410 to determine $UQ_{(fpp)}$ and $UQ_{(sw)}$.

Calculating $Q_{(prc)}$

As discussed above, the Question Percent Random Chance ($Q_{(prc)}$) represents the percent chance of randomly selecting the correct answer(s) to a question. In embodiments, whenever a new question is created, the question module 408 (FIG. 4) automatically calculates the question's $Q_{(prc)}$ and stores this value as a property of the question in the question database 308 (FIG. 3). In other (or overlapping) embodiments, whenever a new question is created, the question's $Q_{(prc)}$ can be manually entered by the author of the question and stored as a property of the question in the question database 308 (FIG. 3).

FIG. 5 illustrates a question set of eight questions. As illustrated in FIG. 5, each question has a number of answer options. The response options are located in the cells where questions and answer options intersect and contain information about the correctness of the corresponding response option. For example, the number 1 symbolizes a response option which is a correct solution to the problem. Further, the number 0 symbolizes a distracter (i.e., incorrect response option). In embodiments, the $Q_{(to)}$ (Total Options) is a count of the number of answer options associated with a question. For example, the $Q_{(to)}$ for Question 3 is 4 since Question 3 has 4 answer options.

In embodiments, the $Q_{(sl)}$ (Selection Limit) denotes the number of options that a respondent is instructed or permitted to select. For example, if Question 1 is a True/False question type, the user would be instructed to select only one option. Therefore, $Q_{(sl)}$ is equal to 1 for question 1. In another example, Question 2 has only two options, but the user may be instructed to "Select all that apply." Accordingly, $Q_{(sl)}$ is equal to 2 for Question 2.

The $Q_{(prc)}$ row in FIG. 5 denotes the percent chance of randomly selecting the correct answer, expressed as a decimal. In embodiments, $Q_{(prc)}$ can be derived using the following calculation where $^{Q_{(to)}}C_{Q_{(sl)}}$ represents the number of possible combinations from $Q_{(to)}$ taking $Q_{(sl)}$ at a time:

IF $(Q_{(to)} > Q_{(sl)})$ THEN $$\left\{Q_{(prc)} = \frac{1}{Q_{(to)}C_{Q_{(sl)}}}(Q_{(sl)})\right\} \text{ ELSE } \left\{Q_{(prc)} = \frac{1}{(2^{Q_{(to)}})}\right\}$$

Using the above equation and Question 2 in FIG. 5 as an example, Question 2 has 2 options ($Q_{(to)}$=2) where the user is instructed to select all options that apply for the question ($Q_{(sl)}$=2). Accordingly, the possible choices are 00, 01, 10, and 11 where 00 denotes the possibility that none of the answer options are selected. Since FIG. 5 indicates 10 as the correct response out of a possible 4 four responses, the probability of randomly selecting the correct response ($Q_{(prc)}$) is ¼=0.25, which is verified by the above equation.

In embodiments, some question types may not permit the automated calculation of $Q_{(prc)}$. An example of such a question type may be a fill-in-the-blank exercise in which the respondent must type a word or phrase as opposed to selecting the correct answer from a list. In this example, the percent chance of producing a specific written word at random may be relatively low. In this case, the question author might decide to manually assign the question a $Q_{(prc)}$ of 0.01.

Calculating $Q_{(ttc)}$ and $Q_{(tti)}$

When a question is selected by the ILAT and a respondent responds to the question, properties are added and/or updated for each of the following by the question module 408: 1) the question; 2) the question's answer options; 3) the respondent's interaction with the question; and 4) the respondent. In embodiments, the variable $Q_{(ttc)}$ (Question Total Times Correct) is the total number of times that a correct response has been submitted for a question. The variable Q(tti) (Question Total Times Incorrect) is the total number of times that an incorrect response has been submitted for a question.

FIG. 6 shows how, in embodiments, the properties of Question 3 and its options can be updated when a respondent responds to a question. As illustrated in FIG. 6, the variables $Q_{(to)}$, $Q_{(sl)}$, and $Q_{(prc)}$ are provided as properties of Question 3. In embodiments, the variable $QO_{(c)}$ indicates if an answer option is correct (1) or incorrect (0). For example, since option 1 of Question 3 is correct, the $QO_{(c)}$ for this option is 1. In embodiments, the variable $QO_{(ts)}$ indicates the total number of times that an answer option has been selected. As an example, the first time a response is submitted for Question 3, the response selected is Option 2, which is an incorrect response. Therefore, the total number of selections for Question 3, Option 2 is equal to one (e.g., $Q_3O_{2(ts)}$=1). Furthermore, the total number of times that $Q_3$ has been answered correctly is 0 (e.g., $Q_{3(ttc)}$=0). Additionally, the total number of times that $Q_3$ has been answered incorrectly is 1 (e.g., $Q_{3(tti)}$=1). As discussed above, the question module 408 (FIG. 4) may receive responses to questions, update the properties of the questions accordingly, and store the updated properties in the question database 308 (FIG. 3). Accordingly, the properties for Question 3 as illustrated in FIG. 6 may be retrieved from the question database 308 (FIG. 3) when determining if a correct response to Question 3 is a false positive or readjusting the stacking weight for Question 3.

Calculating $UQ_{(cbi)}$ and $Q_{(cbi)}$

If a respondent gets an answer wrong after having previously gotten it right, a likely cause may be either (a) the respondent forgot the correct answer, or (b) the respondent simply guessed correctly when previously answering the question. The latter case (b) is considered as a false positive. The former case (a) is treated as a false positive because previous correct responses to the question are no longer representative of the respondent's knowledge. The variable $UQ_{(cbi)}$ (User-Question Correct Before Incorrect), in embodiments, is a count of the number of times that a respondent correctly responds to a problem prior to incorrectly responding to that problem. In embodiments, the variable $Q_{(cbi)}$ (Question Correct Before Incorrect) is the sum of all $UQ_{(cbi)}$ for a given question. In embodiments, the question module 408 determines $UQ_{(cbi)}$ for each user and stores the value in the user history response database 310 (FIG. 3). The question module 408 (FIG. 4) determines $Q_{(cbi)}$ for each question and stores the value in the question database 308 (FIG. 3).

FIG. 7 illustrates $UQ_{(cbi)}$ with respect to users' histories of responding to a question. The "UserID" column in FIG. 7 identifies a particular user. The "QuestionID" column in FIG. 7 identifies a particular question. The "UQ(tti)" column in FIG. 7 indicates the total number of times the user answered the question identified in the "QuestionID" column incorrectly.

The "Response Correctness Array" in FIG. 7 indicates each users' history for responding to the question identified in the "QuestionID." In embodiments, a 0 designates an incorrect response and a 1 designates a correct response. FIG. 7 illustrates that User 5 is responding to Question 1 erratically where User 5 has answered Question 1 incorrectly twice after responding to Question 1 correctly. FIG. 8 illustrates how each response by User 5 to Question 1 affects $U_5Q_{1(cbi)}$. In embodiments, $UQ_{(cbi)}$ is augmented by a number of correct responses before a question is answered incorrectly. For example, the first time User 5 answers Question 1 incorrectly after responding to Question 1 correctly, $U_5Q_{1(cbi)}$ is incremented by 1 since there is one correct response before Question 1 is answered incorrectly. The second time User 5 answers Question 1 incorrectly after responding to $Q_1$ correctly, $U_5Q_{1(cbi)}$ is incremented by 2 since there are two correct responses before Question 1 is answered incorrectly again. Accordingly, as illustrated in FIG. 7, the $UQ_{(cbi)}$ for User 5 is 3. As another example, FIG. 7 illustrates that User 2 answered Question 1 incorrectly after answering Question 1 correctly once. Accordingly, the $UQ_{(cbi)}$ for User 2 is 1.

In embodiments, the variable $UQ_{(cbi)}$ is associated with the variable $U_{(tgf)}$ (User Tendency to Guess or Forget), which represents a likelihood that when a user is answering a question, the user is guessing. $U_{(tgf)}$ may be calculated by the following equation:

$$U_{(tgf)} = \frac{U_{(gfc)}}{U_{(tqa)}},$$

where $U_{(gfc)}$ represents a user's guess or forget count and $U_{(tqa)}$ represents the total questions answered by the user. $U_{(gfc)}$ may be equal to a user's $UQ_{(cbi)}$ for all questions answered by the user since an increase in $UQ_{(cbi)}$ is an indication that the user is guessing the answers to a question. $U_{(tqa)}$ may be incremented by 1 anytime a user submits a response to any question.

Figure 9:
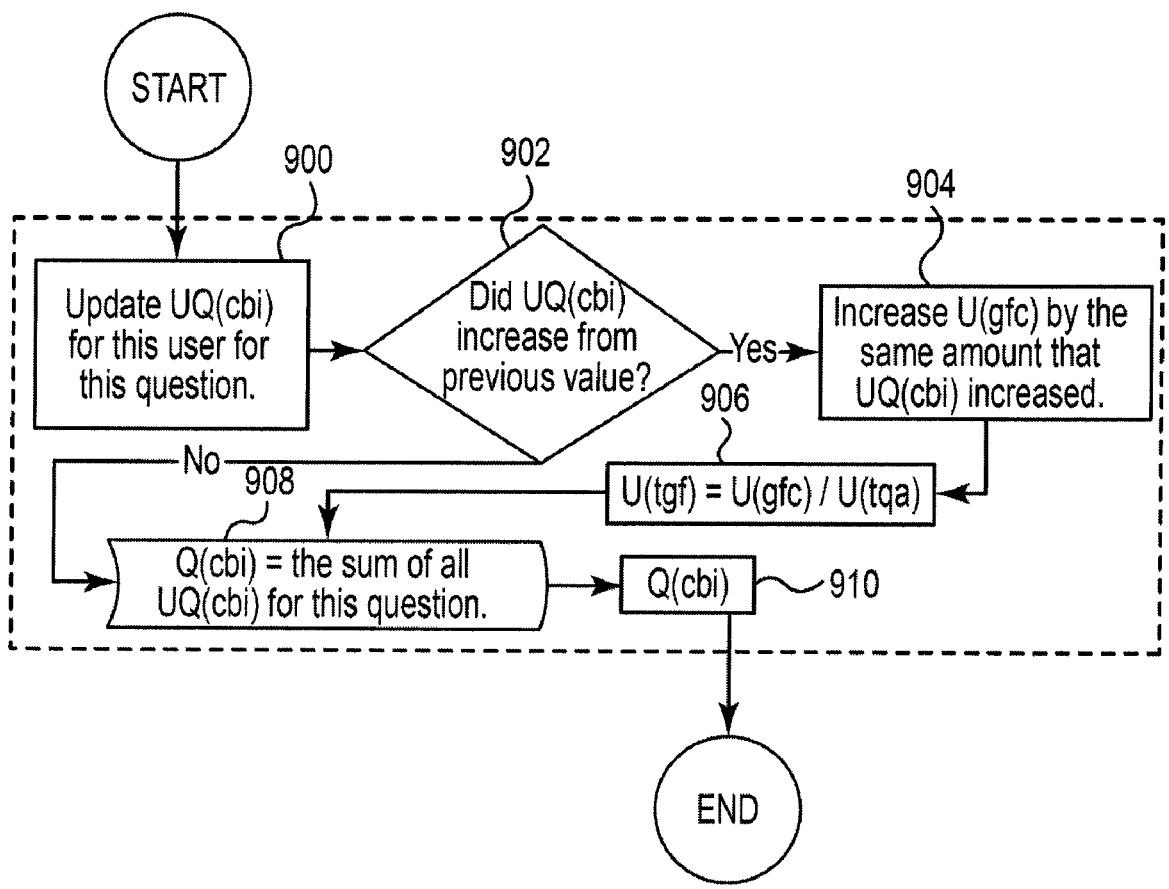
FIG. 9 illustrates an example process for calculating $Q_{(cbi)}$.

FIG. 9 illustrates an example process for calculating $Q_{(cbi)}$ for a particular question. The process starts at 900 where the $UQ_{(cbi)}$ for a particular user answering a particular question is updated (e.g., $UQ_{(cbi)}$ is either incremented or kept the same). Process flow proceeds from 900 to 902 to determine if $UQ_{(cbi)}$ increased from a previous $UQ_{(cbi)}$ value. As discussed above and illustrated in FIG. 7, $UQ_{(cbi)}$ for a particular user is incremented whenever a user answers a question incorrectly after answering the question correctly. If $UQ_{(cbi)}$ did increase from a previous $UQ_{(cbi)}$ value, process flow proceeds from 902 to 904 to increase $U_{(gfc)}$ by the same amount that $UQ_{(cbi)}$ increased. As discussed above, $U_{(gfc)}$ is equal to a user's $UQ_{(cbi)}$ for all questions answered by the user since an increase in $UQ_{(cbi)}$ is an indication that the user is guessing the answers to a question. If $UQ_{(cbi)}$ did not increase from a previous $UQ_{(cbi)}$ value, process flow proceeds from 902 to 908 to calculate $Q_{(cbi)}$.

Process flow proceeds from 906 to 908 to calculate $Q_{(cbi)}$ for a particular question. In embodiments $Q_{(cbi)}$ is the sum of $UQ_{(cbi)}$ for each user for a particular question. For example, referring to FIG. 7, the sum of $UQ_{(cbi)}$ for Question 1 for each user is 5.

Calculating Q(pir)

In embodiments, the variable $Q_{(pir)}$ (Question Percentage of Incorrect Responses) is the percentage, expressed as a decimal, of the total number of users' responses that are incorrect or considered false positives. The $Q_{(pir)}$ for a particular question expressed as a decimal can be calculated by the following equation:

$$Q_{(pir)} = \frac{(Q_{(tti)} + Q_{(cbi)})}{(Q_{(ttc)} + Q_{(tti)})}$$

As illustrated in the above equation, $Q_{(cbi)}$ offsets $Q_{(tti)}$ when calculating $Q_{(pir)}$. Particularly, $Q_{(tti)}$ is increased by $Q_{(cbi)}$ since $Q_{(cbi)}$ indicates that previous correct responses were false positives (e.g., the user answered the question correctly without knowledge of the correct answer). Thus, as illustrated in the above equation, the percentage of questions treated as incorrect responses increases as $Q_{(cbi)}$ increases. In embodiments, the question module 408 (FIG. 3) determines $Q_{(pir)}$ and stores the value in the question database (FIG. 308). In other (or overlapping) embodiments, $Q_{(pir)}$ is not stored as a value since the question module 408 may calculate $Q_{(pir)}$ in real time.

FIG. 10 illustrates respondent response histories and a corresponding $Q_{(cbi)}$ and $Q_{(pir)}$ for Questions 1-4. As illustrated in FIG. 10, the $Q_{(cbi)}$ for Question 1 is 2 since there were two occurrences of answering a question correctly before answering the question incorrectly. Accordingly, the $Q_{(pir)}$ for Question 1 may be calculated using the equation above and the $Q_{(cbi)}$, $Q_{(tti)}$, and $Q_{(ttc)}$ values illustrated in FIG. 10 for Question 1. As also illustrated in FIG. 10, responses to Question 2 appear to contain the highest number of false positives since the $Q_{(cbi)}$ for Question 2 is higher than any other question. In embodiments, the question module 408 (FIG. 4) determines $Q_{(pir)}$ and stores the value in the question database 308 (FIG. 3).

Calculating UQ(ctc)

In embodiments, the variable $UQ_{(ctc)}$ (User-Question Consecutive Times Correct) is the number of times that a Response Correctness Array terminates with one or more consecutive correct responses (in which case $UQ_{(ctc)}$ can be expressed as a positive integer), or one or more consecutive incorrect responses (in which case $UQ_{(ctc)}$ can be expressed as a negative integer). If a Response Correctness Array is empty, then $UQ_{(ctc)}$ has a value of zero. In embodiments, the $UQ_{(ctc)}$ variable is used to determine the likelihood that a correct response to a question is a false positive.

As discussed above, the chronological history of correctness of a user's set of responses to a question can be indicated in a question's response correctness array, or $UQ_{(rca)}$. In embodiments, correct and incorrect responses may be recorded in a $UQ_{(rca)}$ using a series of 0s (to represent a user's incorrect responses to the question) and 1s (to represent a user's correct responses to the question). The $UQ_{(rca)}$ may be stored in the user history response database 310 (FIG. 3). As an example, a $UQ_{(rca)}$ might have the following sequence: 0,1,0,1,1. In this example, the $UQ_{(rca)}$ indicates that the user responded five times to the question, and $UQ_{(ctc)}$ has a value of 2 since the user has responded to the question correctly two times consecutively. FIG. 11 illustrates how $UQ_{(rca)}$ correlates with $UQ_{(ctc)}$. As illustrated in the first row in FIG. 11, the default value for $UQ_{(ctc)}$ is 0 when there are no responses. As further illustrated in the fifth row of responses in FIG. 11, $UQ_{(ctc)}$ is −1 since the user's most recent response is incorrect after answering the question correctly in the previous response.

Figures 12, 13:
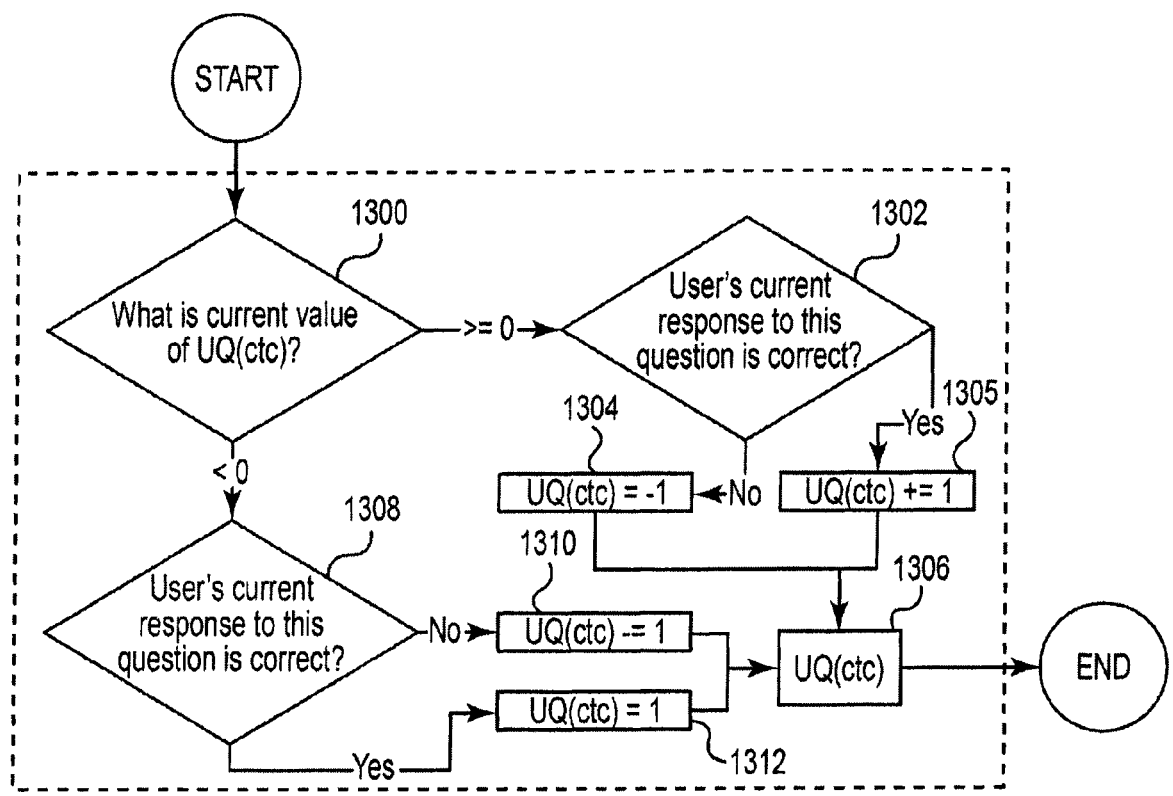
FIG. 12 illustrates users' response histories for a question and a corresponding $UQ_{(cbi)}$ and $UQ_{(ctc)}$.
FIG. 13 illustrates an example process for calculating $UQ_{(ctc)}$.

FIG. 12, illustrates users' response histories for Question 1 and a corresponding $UQ_{(cbi)}$ and $UQ_{(ctc)}$ for each user. For example, User 2 has a $UQ_{(rca)}$ of 0,1,0,1. Accordingly, since User 2 answered Question 1 correctly once prior to answering Question 1 incorrectly, $UQ_{(cbi)}$ for User 2 for Question 1 is 1. Additionally, since User 2's most recent response to Question 1 is correct after answering the question incorrectly in the previous response, $UQ_{(ctc)}$ for User 2 is 1.

FIG. 13 illustrates an example process for calculating $UQ_{(ctc)}$. In embodiments, the question module 408 performs the process illustrated in FIG. 13. The process starts at 1300 to determine the current value of $UQ_{(ctc)}$. If the current value of $UQ_{(ctc)}$ is greater than or equal to 0, process flow proceeds from 1302 to determine if the user's current response to the question is correct. If the user's current response to the question is incorrect, process flow proceeds from 1302 to 1304 to change $UQ_{(ctc)}$ to −1. If the user's current response to the question is correct, process flow proceeds from 1302 to 1305 to increment $UQ_{(ctc)}$ by 1. Process flow proceeds from 1304 and 1305 to 1306 to store $UQ_{(ctc)}$. The variable $UQ_{(ctc)}$ for each user may be stored in the user history response database 310 (FIG. 3).

If the current value of $UQ_{(ctc)}$ is less than 0 at 1300, process flow proceeds from 1300 to 1308 to determine if the user's current response to a question is correct. If the user's current response to the question is incorrect, process flow proceeds from 1308 to 1310 to decrement $UQ_{(ctc)}$ by 1. If the user's current response to the question is correct, process flow proceeds from 1308 to 1312 to change $UQ_{(ctc)}$ to 1. Process flow proceeds from 1310 and 1312 to 1306 to store $UQ_{(ctc)}$.

Calculating $Q_{(scav)}$ and $Q_{(scsd)}$

In embodiments, the variable $UQ_{(dt)}$ (User-Question Display Time) represents the time when a question is displayed to a respondent, and the variable $UQ_{(rt)}$ (User-Question Response Time) represents the time when a respondent responds to a question. FIG. 14 illustrates when an option for a question is displayed and when a user responds to the question. The "tDisplayed" column of FIG. 14 illustrates when the option for the question is displayed. The "tResponded" column of FIG. 14 illustrates when the user responds to the question. For example, FIG. 14 illustrates that Option 1 of Question 9 was displayed to User 1 on Sep. 10, 2008 at 9:58:37, and User 1 submitted a response to Question 9 on the same day 12 seconds later.

The "Response" column in FIG. 14 indicates the type of response submitted for the question. For example, a 0 in the "Response" column indicates that an option is not selected, and a 1 in the "Response" column indicates that the option is selected. The "Response Correctness" column in FIG. 14 indicates if the user's response is correct. For example, a 0 in the "Response Correctness" column indicates that the user's response is incorrect, and a 1 in the "Response Correctness" column indicates that the user's response is correct. As illustrated in FIG. 14, the first time ($id_{(1)}$) Option 1 for Question 9 is displayed to User 1, the user did not select this option, which is an incorrect response. The second time ($id_{(5)}$) Option 1 for Question 9 is displayed to User 1, the user selected this option, which is a correct response.

In embodiments, $UQ_{(sc)}$ (User-Question Seconds to Correct) represents the number of seconds it took for a user to submit a correct answer to a question. In embodiments, $UQ_{(si)}$ (User-Question Seconds to Incorrect) represents the number of seconds it took for the user to submit an incorrect answer to a question. FIG. 15 illustrates how long it took for a user to respond to a question correctly or incorrectly. The "id" column in FIG. 15 represents an order of responses received by an ILAT for any particular question. For example, FIG. 15 illustrates that an ILAT's first received response is a response from User 1 for Question 9, and the ILAT's seventh received response is a response from User 4 for Question 9. The "Seconds to Correct" column in FIG. 15 corresponds to the $UQ_{(sc)}$, and the "Seconds to Incorrect" column corresponds to $UQ_{(si)}$. As illustrated in FIG. 15, the first time User 1 responded to Question 9, User 1 responded incorrectly in 12 seconds (e.g., $UQ_{(si)}$=12). The second time User responded to Question 9, User responded correctly in 9 seconds (e.g., $UQ_{(sc)}$=9).

In embodiments, upon updating a $UQ_{(sc)}$ or $UQ_{(si)}$ value, if more than one $UQ_{(sc)}$ or $UQ_{(si)}$ exists for a question, the average number of seconds to provide a correct response ($Q_{(scav)}$) or incorrect response ($Q_{(siav)}$) can be updated by the question module 408 (FIG. 4) as a property of the question. In embodiments, $Q_{(scav)}$ equals the total of all $UQ_{(sc)}$ for that question divided by the number of instances of $UQ_{(sc)}$ (e.g., the number of times the question has been answered correctly). In embodiments, $Q_{(siav)}$ equals the total of all $UQ_{(si)}$ for that Q divided by the number of instances of $UQ_{(si)}$ (e.g., the number of times the question has been answered incorrectly). Furthermore, embodiments may record standard deviations for correct ($Q_{(scsd)}$=STDEVP (all $UQ_{(sc)}$)) and incorrect ($Q_{(sisd)}$=STDEVP (all $UQ_{(si)}$)) response times. The function STDEVP may include any desired method for calculating a standard deviation using any desired probability distribution. In embodiments, the STDEVP function can be performed using a methodology similar to the methodology performed by Microsoft Excel for the STDEVP function.

FIG. 16 illustrates an example property list for Question 9. As illustrated in FIG. 16, the average number of seconds to provide a correct response ($Q_{(scav)}$) to Question 9 is 12.5 seconds, while the average number of seconds to provide an incorrect response ($Q_{(siav)}$) to Question 9 is 16 seconds. The standard deviation for responding to Question 9 correctly is 2.86 seconds, while the standard deviation for responding to Question 9 incorrectly is 3.3.

The Effect of a User's Response Time on $UQ_{(fpp)}$

In embodiments, $UQ_{(sc)}$ is used to determine the probability that a user's correct response to a question is a false positive. As an example, the likelihood that a response is a false positive is inversely proportional to the respondent's correct response time when that time is lower than the average response time to answer a question correctly (i.e., $Q_{(scav)}$). Consider the following example: The average amount of time in which a correct response is given for Question 1 is 26 seconds. User 3 (who spent only two seconds to provide a correct response) is substantially more likely than User 2 (who spent 30 seconds to provide a correct response) to have guessed at the answer since the fast response time may indicate that User 3 is randomly selecting a response to a question without consideration of the content of all the responses to the question.

Figures 17, 18:
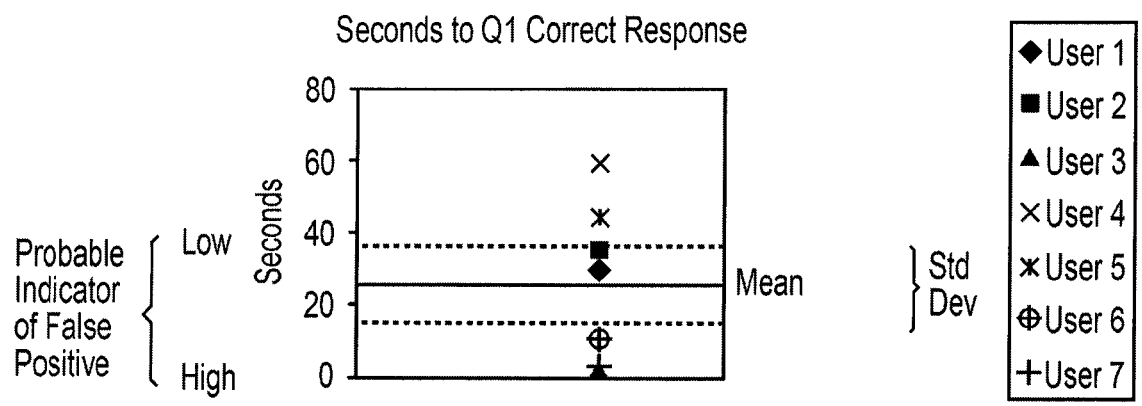
FIG. 17 illustrates an example distribution of correct responses to a question for one or more users.
FIG. 18 illustrates the response times illustrated in FIG. 17 and the corresponding $Q_{(svac)}$ and $Q_{(scsd)}$.

FIG. 17 illustrates an example distribution of correct responses to Question 1 for Users 1-7. In the example discussed above, User 3 has $UQ_{(sc)}$=2 and User 2 has a $UQ_{(sc)}$=30. In embodiments, the variable $UQ_{(scse)}$ represents a standard error from the standard deviation where $UQ_{(scse)}$=STANDARDIZE($UQ_{(sc)}$, $Q_{(scav)}$, $Q_{(scsd)}$). Using this equation for $UQ_{(scse)}$ and the distribution of responses illustrated in FIG. 17, a $UQ_{(sc)}$=2 gives us a standard error ($UQ_{(scse)}$) of −1.185216. Using a rounding calculation of $UQ_{(scsdfm)}$=CEILING(ABS(MIN($UQ_{(scse)}$,0)),1), $UQ_{(scse)}$ is rounded up to indicate that a response time of two seconds, according to the distribution of FIG. 17 is two standard deviations from the mean. In embodiments, the STANDARDIZE and CEILING functions are performed using methodologies similar to the methodologies performed by Microsoft Excel for the STANDARDIZE and CEILING functions.

As indicated in the above calculation for $UQ_{(scsdfm)}$, any response time higher than the mean generates $UQ_{(scsdfm)}$=0. That is, according to embodiments, a response time which is higher than the average response time to answer the question correctly has no effect on the response's false positive probability ($UQ_{(fpp)}$). FIG. 18 illustrates the response times depicted in FIG. 17 and the corresponding $Q_{(scav)}$ and $Q_{(scsd)}$ for this distribution. FIG. 18 also illustrates the $Q_{(scse)}$ for User 3.

In embodiments, the first operand in the $UQ_{(fpp)}$ calculation $UQ_{(fpp1)}$, which may be calculated by the evaluation module 410 (FIG. 4). $UQ_{(fpp1)}$ may be calculated according to the following equation:

$$\text{IF } (UQ_{(scsdfm)} > 0) \text{ THEN } \left\{ UQ_{(fpp1)} \mathrel{+}= \frac{UQ_{(scsdfm)}}{UQ_{(ctc)}^{UQ_{(ctc)}} * (5 + UQ_{(scsdfm)})} \right\}$$

According to the above equation, and as illustrated in FIG. 19, $UQ_{(fpp1)}$ increases as $UQ_{(scsdfm)}$ increases, but decreases as $UQ_{(ctc)}$ increases. $UQ_{(fpp1)}$ increases as $UQ_{(scsdfm)}$ increases because a response time that is faster than the average response time indicates that a user may be randomly selecting a response. However, $UQ_{(fpp1)}$ decreases as $UQ_{(ctc)}$ increases because if a user is consistently selecting the correct response for a question, the user is less likely randomly selecting the correct response. As illustrated in FIG. 19, one consecutive correct response that is nominally faster ($UQ_{(scsdfm)}=1$) than average increases the false positive probability ($U_{(fpp1)}$) by 0.17. One consecutive correct response that is radically faster than average ($UQ_{(scsdfm)}=3$) increases the false positive probability by 0.38. However, a second consecutive correct response radically faster than average increases the false positive probability by only 0.09 (e.g., $U_{(fpp1)}$ is decreased as $U_{(ctc)}$ increases).

The Effect of Q(cbi) on UQ(fpp)

When a respondent responds incorrectly to a question after having previously responded correctly to the question (thus incrementing $Q_{(cbi)}$ for the question), embodiments retroactively flag any previous responses to the question as having a $UQ_{(fpp)}$ of 1. FIG. 20 illustrates how a correct response may be flagged as a false positive after Question 9 is answered incorrectly. For example, User 1's incorrect response of Question 9 (id 14) invalidates User 1's previous correct response of Question 9 (id 5). Accordingly, User 1's correct response to question 9 (id 5) is identified as a false positive. In embodiments, flagging a response as a false positive triggers a recalculation of $Q_{(scav)}$, $Q_{(scsd)}$, $Q_{(siav)}$, and $Q_{(sisd)}$.

Particularly, in embodiments, whenever these values are recalculated, a false positive causes the calculation to interchange the Null and numeric values under Seconds to Correct ($UQ_{(sc)}$) and Seconds to Incorrect ($UQ_{(si)}$), respectively, prior to executing the calculation. Accordingly, response times for false positives are not counted in the $Q_{(scav)}$ and therefore, will not incorrectly skew the results of the $UQ_{(scsdfm)}$ or $UQ_{(fpp)}$ calculations of new responses to a question.

The Effect of User Tendencies on $UQ_{(fpp)}$

In embodiments, $U_{(tgf)}$ can be used as an operand in evaluating the $UQ_{(fpp)}$ for any correct response to a question. As discussed above, $U_{(tgf)}=U_{(gfc)}/U_{(tqa)}$. Regarding $U_{(gfc)}$, in embodiments, whenever a false positive with a probability of 1 is associated with a user's response (as in FIG. 20), $U_{(gfc)}$ is incremented accordingly. For example, using FIG. 20, $U_{1(gfc)}$ would have a value of 1. In embodiments, each new $UQ_{(fpp)}$ with a value of 1.00, regardless of context (e.g. question was asked in Course A vs. Course B), increments $U_{(gfc)}$.

As an example, the higher a learner's tendency to correctly guess and/or forget a correct answer ($U_{(tgf)}$), the more likely that any given correct response by that learner is a false positive. In embodiments, the weight of this operand is mitigated by other operands, and has a minor overall effect on $UQ_{(fpp)}$.

In embodiments, the second operand in the $UQ_{(fpp)}$ calculation is $UQ_{(fpp2)}$. According to embodiments, $UQ_{(fpp2)}$ may be calculated according to the following equation:

$$UQ_{(fpp2)} = \frac{U_{(tgf)}}{UQ_{(ctc)}^{UQ_{(ctc)}} * 4}$$

According to the above equation, as illustrated in FIG. 21, $UQ_{(fpp2)}$ increases as $U_{(tgf)}$ increases, but decreases as $UQ_{(ctc)}$ increases. $UQ_{(fpp2)}$ increases as $U_{(tgf)}$ increases since $U_{(tgf)}$ indicates a user's tendency to guess or forget a correct answer for each correct response the user provides. However, as discussed above, $UQ_{(fpp2)}$ decreases as $UQ_{(ctc)}$ increases since a user is less likely to be randomly selecting the correct response if the user consistently selects the correct response.

FIG. 21 illustrates an extreme example where a user has been shown to guess or forget 99% of the time. When $U_{(tgf)}$ is 0.99, the false positive probability of that user's first consecutive correct response to a question will be increased by 0.25. Further, the false positive probability of that user's second consecutive correct response to a question will only be increased by 0.06 (e.g., $UQ_{(fpp2)}$ decreases as $U_{(ctc)}$ increases). A more likely scenario is where a user has been shown to guess or forget 25% of the time. When $U_{(tgf)}$ is 0.25, the false positive probability of that user's first consecutive correct response to a question will be increased by 0.06. Additionally, the false positive probability of that user's second consecutive correct response to a question will only be increased by 0.02.

The Effect of a Question's Quality of Distracters on $UQ_{(fpp)}$

The ability of incorrect option(s) to distract users from the correct option(s) may be used to determine the likelihood that a user's correct response is a false positive. The more likely a user will select the incorrect response, the higher the ability of that incorrect response to distract the user from the correct response. FIG. 22 illustrates two example mathematical questions. As illustrated for Question 12, all the answer options are numbers. However, for Question 13, option (d) is a word. Since option (d) is a word instead of a number, users are less likely to select option (d). Accordingly, option (d) is considered to be a low quality distracter.

In embodiments, the variable $Q_{(qod)}$ (Quality of Distracters) is a measure of the quality of a question's distracters, measured on a scale between 0 (abysmal) and 1 (superb). In alternative embodiments, the scale may vary to any desired values to represent poor and high quality distracters. Poor quality distracters may be easier to eliminate for their lack of credibility, thereby increasing the likelihood of selecting the correct answer without really knowing that the answer is correct. Thus, in embodiments, $Q_{(qod)}$ is factored into a question's false positive probability $Q_{(fpp)}$.

In embodiments, the following is a non-exclusive list of variables used to determine $Q_{(qod)}$:

$Q_{(tco)}$ Question Total Correct Options
For a set of options associated with a question, $Q_{(tco)}$ is the total number of options that are correct.

$Q_{(tio)}$ Question Total Incorrect Options
For a set of options associated with a question, $Q_{(tio)}$ is the total number of options that are incorrect.

$Q_{(ec)}$ Question Expected Correct
For a given question option, $Q_{(ec)}$ is the percentage of the number of times that the correct options are expected to be selected if all question options are equally believable to be correct. In embodiments, $Q_{(ec)}=Q_{(tco)}/Q_{(to)}$, where $Q_{(to)}$ represents the total number of answer options associated with the question. As an example, if a question has 4 total options ($Q_{(to)}$) with 1 of those options designated as a correct response ($Q_{(tco)}$), then $Q_{(ec)}=1/4=0.25$, which means that the correct response is expected to be selected 25% of the time.

$Q_{(tos)}$ Question Total Options Selected
For a given question, $Q_{(tos)}$ is the sum of all $QO_{(ts)}$, which represents the total number of times that an answer option has been selected.

$Q_{(tcos)}$ Question Total Correct Options Selected
For a given question, $Q_{(tcos)}$ is the total number of correct options selected.

$Q_{(tios)}$ Question Total Incorrect Options Selected

For a given question, $Q_{(tios)}$ is the total number of incorrect options selected.

$QO_{(eps)}$ Question-Option Expected Percentage of Selections

For a given question option, $QO_{(eps)}$ is the percentage of the number of times that the option is expected to be selected if all question options are equally believable to be correct. In embodiments, $QO_{(eps)}=1/Q_{(to)}$. As an example, if a question has 4 answer options ($Q_{(to)}$), for the first option, $QO_{1(eps)}=\frac{1}{4}=0.25$, which means that Option 1 is expected to be selected 25% of the time.

$QO_{(b)}$ Question-Option Believability

For a given question option, this is the percentage of the time that this option is actually selected. In embodiments, $QO_{(b)}=QO_{(ts)}/Q_{(tos)}$. As an example, if a question with three options has been presented 10 times ($Q_{(ts)}$), and the first option is selected 3 times ($QO_{1(ts)}$), $QO_{1(b)}=\frac{3}{10}=0.3$, which means that option 1 is selected 30% of the time.

$QO_{(dde)}$ Question-Option Distracter Deviation from Expected Percentage of Selections In embodiments, the following equation applies to distracters only. If the answer option is correct, then $QO_{(dde)}=0$.

$$IF(QO_{(eps)}-QO_{(b)}>0)\text{THEN }\{QO_{(dde)}=QO_{(eps)}-QO_{(b)}\}\text{ELSE}\{QO_{(dde)}=0\}$$

As illustrated in the preceding equation, if the percentage of the number of times that an option is expected to be selected ($QO_{(eps)}$) is greater than the percentage that the option is actually selected ($QO_{(b)}$), $QO_{(dde)}$ is the difference between $QO_{(eps)}$ and $QO_{(b)}$. Otherwise, $QO_{(dde)}$ is 0.

$Q_{(dde)}$ Question Distracter Deviation from Expected Percentage of Selections In embodiments, $Q_{(dde)}$ is the sum of all $QO_{(dde)}$ for a given question.

In embodiments, $Q_{(qod)}$ may be calculated according to the following equation:

$$\text{IF } (Q_{(sl)} > 0) \text{ THEN}$$

$$\left\{Q_{(qod)} = \text{MAX}\left(\text{MIN}\left(\text{MAX}\left(\left(\left(\frac{Q_{(tios)}}{Q_{(tos)}*}\right)*\frac{1}{Q_{(tio)}}\right)*\frac{1}{Q_{(ec)}*Q_{(tco)}}, 0\right), 1\right) - Q_{(dde)}, 0\right)\right\}\text{ELSE }\{Q_{(qod)} = 1\}$$

An example of a question type where $Q_{(sl)}=0$ is a fill in the blank question type. As illustrated in the above equation, $Q_{(qod)}$ may represent the likelihood of selecting one or more incorrect options.

FIG. 23 illustrates a question (e.g., Question 1) with four answer options, one of which is correct, and three of which are incorrect. If each answer option were equally believable to be correct, it is expected that each option is selected an equal number of times ($QO_{(eps)}$ is the same for each option). As illustrated in FIG. 23, each answer option had in fact been selected nine times, which also indicates that $QO_{(b)}$ is the same for each question. This distribution of selections suggests that the distracters are of superb quality, as no distracter seems any less believable than the correct answer option. Using the calculation above for $Q_{(qod)}$, for this question, $Q_{(qod)}=1.00$. As another example, FIG. 24 illustrates a $Q_{(qod)}$ value and values of operands used in the $Q_{(qod)}$ equation for Question 4, where the distracters are not selected an equal number of times.

FIG. 25A and FIG. 25B illustrate how the value of $Q_{(qod)}$ changes as the distribution of answer option selections varies. For Question 2, only the correct answer option is selected. Thus, the quality of the distracters for Question 2 is abysmal (e.g., none of the distracters seems to be a credible choice). Accordingly, $Q_{(qod)}$ is at the opposite (i.e. low) end of the scale (0.00) compared to Question 1 (1.00). For Question 3, only the correct response option and one distracter is selected, with the correct response selected more times than the distracter. Thus, one of the distracters seems somewhat credible, but the other two distracters do not appear to be credible at all. Accordingly, $Q_{(qod)}$ is at the very low end of the scale (0.03) for Question 3.

For Question 4, only the correct response and two distracters are selected, with the correct response selected more times than the two distracters. Thus, one of the distracters seems somewhat credible, another has minor credibility, and the other does not appear to be credible at all since it is never selected. Accordingly, $Q_{(qod)}$ is still low (0.25) for Question 4.

For Question 5, the correct response and all the distracters are selected. As illustrated in FIG. 25A, there have been just as many incorrect responses as correct responses. Therefore, the set of distracters as a whole distract users from the correct response. However, there are clear differences in the quality of one distracter versus another since one distracter is selected more than the other distracters combined. Accordingly, $Q_{(qod)}$ is medium-low (0.33) for Question 5.

For Question 6, the correct response and all three distracters are selected with the correct response selected more often than any individual distracter and each distracter selected an equal number of times. As illustrated in FIG. 25A, there have been just as many incorrect responses as correct responses. Each distracter seems to be as effective as the other two distracters since each distracter is selected the same number of times. However, no distracter is as credible as the correct answer since the correct answer is selected the most. Accordingly, $Q_{(qod)}$ is in the mid range (0.42) for Question 6.

For Question 7, the correct response and all three distracters are selected with one distracter selected the same number of times as the correct response. $Q_{(qod)}$ has surpassed the mid range (0.58). As illustrated in FIG. 25B, there have been more incorrect responses than correct responses, which is what is expected when high quality distracters outnumber the correct answer options. However, one distracter is clearly more credible than the other two distracters since that distracter is selected more often than the other two distracters. Accordingly, $Q_{(qod)}$ has surpassed the mid range (0.58) for Question 7.

For Question 8, as illustrated in FIG. 25B, the incorrect responses outnumber the correct responses. As illustrated in FIG. 25B, respondents are having a harder time discriminating among the distracters for Question 8 compared to Question 7. Accordingly, $Q_{(qod)}$ is medium-high (0.72) for Question 8.

For Question 9, as illustrated in FIG. 25B, $Q_{(qod)}$ is in the high range (0.92) the incorrect responses again outnumber the correct responses. As illustrated in FIG. 25B, since the number of selections of distracters for Question 9 is higher than Question 8, respondents are clearly having a harder time discriminating among the distracters for Question 9 compared to Question 8. Accordingly, $Q_{(qod)}$ is in the high range (0.92) for Question 9.

For Question 10, the incorrect responses again outnumber the correct responses. However, as illustrated in FIG. 25B, there is a clear preference for one distracter over the other two distracters, which indicates that the other two distracters are not as credible as the preferred distracter. Accordingly, $Q_{(qod)}$ is still high for Question 10, but has decreased (0.90) when compared to Question 9.

For Question 11, as illustrated in FIG. 17, the incorrect responses outnumber again outnumber the correct responses. However, compared to Question 10, there seems to be a common misconception regarding the distracters for Question 11 since one of the distracters is selected twice as much as the other two distracters combined. Accordingly, $Q_{(qod)}$ for Question 11 has decreased (0.75) compared to Question 10.

Figure 26:
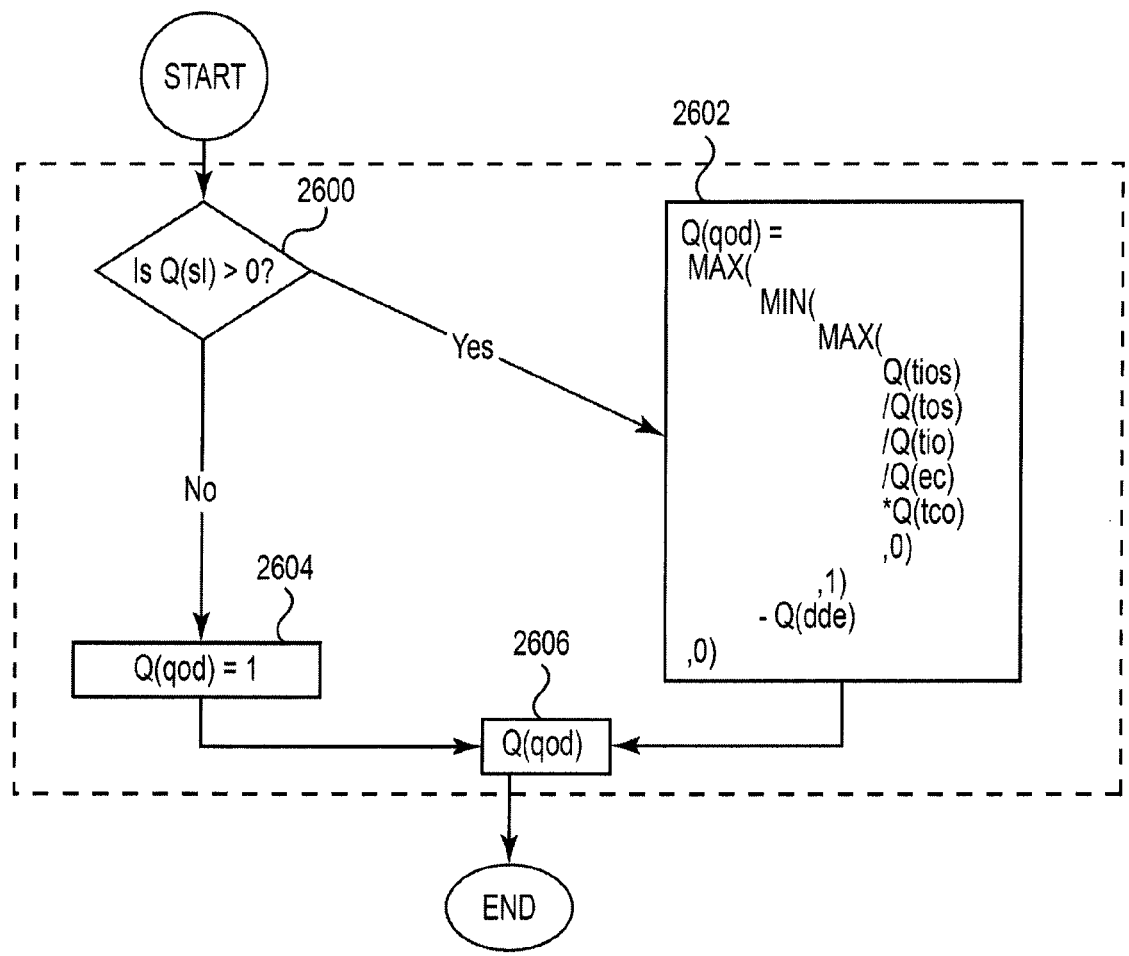
FIG. 26 illustrates an example process for calculating $Q_{(qod)}$.

FIG. 26 illustrates an example process for calculating $Q_{(qod)}$ for a particular question. In embodiments, the process starts at 2600 where it is determined if $Q_{(sl)}$ greater than or equal to 0. If $Q_{(sl)}$ is greater than 0, process flow proceeds from 2600 to 2602 where $Q_{(qod)}$ may be calculated using the equation discussed above for $Q_{(qod)}$. In embodiments, $Q_{(qod)}$ can be stored as a property of a particular question in the question database 308 (FIG. 3). Process flow proceeds from 2602 to 2606 to store $Q_{(qod)}$. If $Q_{(sl)}$ is less than or equal to 0 at 2600, process flow proceeds to 2604 where $Q_{(qod)}$ is set to 1. Process flow proceeds from 2604 to 2606 to store $Q_{(qod)}$. In embodiments, the question module 408 performs the process illustrated in FIG. 26.

In embodiments, the variable $Q_{(fpo)}$ (Question False Positive Offset) is a value that strengthens the effect of $Q_{(prc)}$ on $UQ_{(fpp)}$ as the value of $Q_{(qod)}$ decreases. As an example, when a prudent test taker does not know the correct answer to a question, his first strategy can be not to select an answer at random. Instead the test taker attempts to reduce the number of credible answer options by process of elimination. If the test taker can reduce the number of credible answer options from five down to three, for example, he will have better odds of guessing the correct answer, thus increasing the odds of registering a false positive. Distracters of high quality are more difficult to eliminate than low quality distracters. Particularly, as the quality of distracters increase, the percent chance of randomly selecting the correct answer from a set of answer options decreases. The following equation illustrates how $Q_{(qod)}$ mitigates $Q_{(prc)}$ for the purposes of estimating $UQ_{(fpp)}$:

$$\text{IF } (Q_{(qod)} = 0) \text{ THEN } \{Q_{(qod)} = 0.01\}$$

$$Q_{(fpo)} = \text{MIN}\left(\text{MAX}\left(\frac{Q_{(prc)}}{Q_{(qod)}}, 0.01,\right), 0.99\right)$$

In embodiments, $Q_{(fpo)}$ is not used in the Certainty mode.

FIG. 27 illustrates how $Q_{(fpo)}$ varies when $Q_{(prc)}$ and $Q_{(qod)}$ varies. As illustrated in FIG. 27, when the quality of distracters is high (i.e., when $Q_{(qod)}=1.00$), then the percent random chance of selecting the correct answer $Q_{(prc)}$ is not affected by $Q_{(qod)}$. That is, since all distracters are treated as equally credible, $Q_{(fpo)}=Q_{(prc)}$. However, as the quality of the distracters degrades, the percent random chance of selecting the correct answer increases (e.g., it is easier for the user to disqualify the poor distracter and randomly select the correct choice). Therefore, a lower $Q_{(qod)}$ effectively raises $Q_{(prc)}$ as illustrated in FIG. 27. Accordingly, $Q_{(fpo)}$ represents the probability of guessing the right answer to a question after taking into account the quality of the distracters $Q_{(qod)}$ of the question.

In embodiments if $Q_{(qod)}=0$, then every response submitted for that question has been a correct response. This situation does not always indicate a definite false positive where $UQ_{(fpp)}$ would equal 1.00. This situation may indicate that the question itself is too easy for the audience, or that the distracters are absurd alternatives to the correct answer. In either case, the frequency that this question is re-presented to the learner, in embodiments, will be dramatically reduced by the $UQ_{(ctc)}$ factor (e.g., as $UQ_{(ctc)}$ increases, the likelihood of seeing the question again decreases). However, the variable $UQ_{(fpp)}$ is increased by $Q_{(fpo)}$ since the latter case represents a situation in which the learner is more likely to get the answer right without necessarily knowing the answer.

In embodiments, the third operand in the $UQ_{(fpp)}$ calculation is $UQ_{(fpp3)}$ calculated by the following equation:

$$UQ_{(fpp3)} = \frac{Q_{(fpo)}}{UQ_{(ctc)}^{UQ_{(ctc)}}}$$

As discussed above, $Q_{(fpo)}$ is correlated with the percent random chance of selecting the correct answer $Q_{(prc)}$ after taking into account the quality of the distracters $Q_{(qod)}$. As illustrated in the above equation and FIG. 28, $UQ_{(fpp3)}$ increases as $Q_{(fpo)}$ increases. If $Q_{(fpo)}=0.99$, then there is a 99% chance of correctly guessing the correct answer. In this extreme example, if the user has submitted only one consecutive correct response, $UQ_{(fpp3)}=0.99$. However, if the user has submitted two consecutive correct responses, $UQ_{(fpp3)}=0.25$. In a more likely scenario where $Q_{(fpo)}=0.25$ (e.g., there is a 25% chance of correctly guessing the correct answer, as calculated from a $Q_{(qod)}$ of 0.80 and a $Q_{(prc)}$ of 0.20) if the user has submitted only one consecutive correct response, $UQ_{(fpp3)}=0.25$. If the user has submitted two consecutive correct responses, $UQ_{(fpp3)}=0.06$.

Calculating $UQ_{(fpp3)}=0.06$

Figure 29:
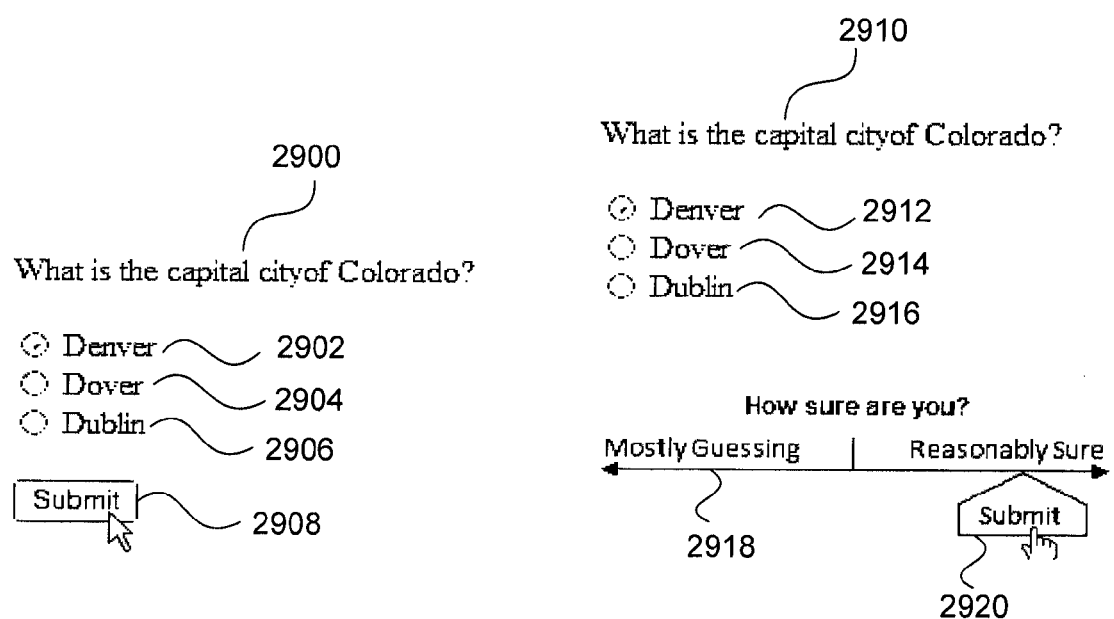
FIG. 29 illustrates a question illustrated in submit mode and certainty mode.

Generally, a method for submitting a response to a question includes clicking a "Submit" button or some variation of the same type of submission method. In embodiments, "Certainty Mode" replaces the "Submit" button with a mechanism for reporting the respondent's assuredness that his response is correct. FIG. 29 illustrates how an embodiment of the Certainty Mode feature replaces a standard Submit button. The left side of FIG. 29 illustrates a first question 2900 with answer options 2902-2906. The question 2900 is in standard submission mode where a user clicks the "Submit" button 2908 to submit a response. The right side of FIG. 29 illustrates the question 2910 a second time with answer options 2912-2916. However, the second instance of the question 2910 is in the "Certainty Mode" where the user is presented with a scale 2918 and submit button 2920 that slides along the scale 2918, which permits a user to report a level of confidence for a response. For example, if the user is highly confident in a response, the user may slide the submit button 2920 to the "Reasonably Sure" side of the scale 2918 and click the submit 2920 button. If the user is not confidant in the selected response, the user may slide the submit button 2918 to the "Mostly Guessing" side of the scale and click the submit button. In embodiments, the actual wording (e.g. "Mostly Guessing") and the format of the scale may vary to any desired wording and format, respectively. Embodiments may use a sliding scale of 0% to 100%, where the higher the percentage reported, the more confident the user is in the selected response.

Figure 30:
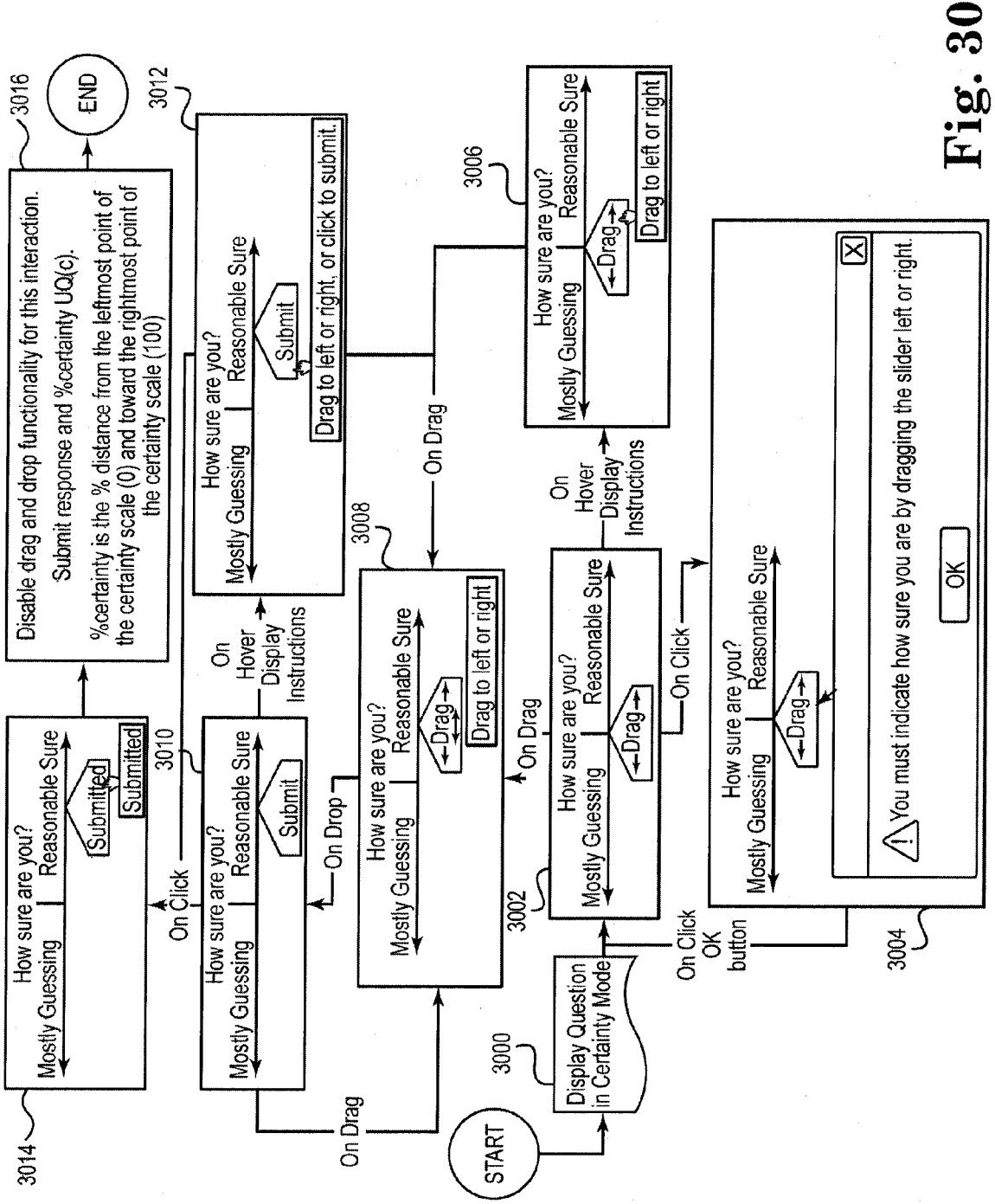
FIG. 30 illustrates an example process for displaying a question in the certainty mode.

FIG. 30 illustrates an example process for displaying a question in the Certainty Mode feature. Process flow begins at 3000 where a question is displayed in the "Certainty Mode." In embodiments, process flow proceeds from 3000 to 3002 where a scale with a button displaying "drag" is displayed to the user. If the user clicks the button without indicating a level of confidence, process flow proceeds from 3002 to 3004 where the user is notified that the user must indicate a degree of certainty prior to submitting a response to the question. In embodiments, this notification can be displayed in a pop-up window where the user can acknowledge receipt of the notification by pressing an "ok" button. Upon acknowledging receipt of the notification, process flow returns from 3004 to 3002. Upon moving a mouse cursor over the button, process flow proceeds from 3002 to 3006 where the user receives instructions to move the button to the left or right side of the scale.

Process flow proceeds from 3006 to 3008 if the user moves the button to the left or right side of the scale. Process also proceeds from 3002 to 3008 if the user moves the button to the left or right side of the scale. Upon placing the button on the left or right side of the scale, process flow proceeds from 3008 to 3010 where the button display is changed from "drag" to "submit." Upon placing a cursor over the button, process flow proceeds from 3010 to 3012 where the user receives instructions to move the button left or right or click the button to submit a selected response to a question. If the user further moves the button, process flow returns from 3012 to 3008 where the steps described above for 3008 are repeated.

If the user clicks the button, process flow proceeds from 3012 to 3014 where the user receives notification that the user's response is submitted. Process flow proceeds from 3014 to 3016 to disable the drag drop functionality of the button. Additionally, in embodiments, when the user clicks the button, a % certainty can be determined using a distance from the leftmost point of the scale (0) and toward the rightmost point of the scale (100). The user's response and % certainty are submitted.

In embodiments, the variable $S_{(ct)}$ (System Certainty Threshold) represents a degree of certainty (e.g. 85%) below which any correct response by any user is treated as a false positive. In embodiments, $U_{(ct)}$ (User Certainty Threshold) represents a degree of certainty (e.g., 85%) below which any correct response by a particular user is treated as a false positive. For example, embodiments may use a series of test questions to evaluate the correlation between an individual's willingness to act in the face of the individual's reported level of certainty. Particularly, the series of test questions may reveal that a user is a natural risk taker since the user is more likely to select a response even though the user is not certain that the response is correct. Alternatively, the series of test questions may reveal that the user is conservative since the user is not likely to select a response unless the user is certain that the response is correct. Accordingly, users identified as natural risk takers may have $U_{(ct)}=40\%$ whereas users identified as conservative may have $U_{(ct)}=75\%$ since the conservative user is not likely to select a response unless the conservative user is certain that the response is correct. In embodiments, if no $U_{(ct)}$ is specified, $U_{(ct)}=S_{(ct)}$.

In embodiments, $UQ_{(cw)}$ (Certainty Weight) is a value that uses $UQ_{(ctc)}$, $UQ_{(c)}$, and $U_{(ct)}$ or $S_{(ct)}$ using the following three point gradient calculation:

IF $(UQ_{(ctc)} > 0 \ \& \ UQ_{(c)} >= U_{(ct)})$
$$\{UQ_{(cw1)} = -((UQ_{(c)} - U_{(ct)}) * UQ_{(ctc)} * 2^{UQ_{(ctc)}}\};$$
$$UQ_{(cw)} = UQ_{(cw1)}\}$$

ELSE IF $(UQ_{(ctc)} > 0 \ \& \ UQ_{(c)} < U_{(ct)})$
$$\left\{UQ_{(cw2)} = -\left(\frac{(UQ_{(c)} - U_{(ct)}) * 2^{UQ_{(ctc)}}}{10}\right); UQ_{(cw)} = UQ_{(cw2)}\right\}$$

ELSE IF $(UQ_{(ctc)} < 0 \ \& \ UQ_{(c)} >= U_{(ct)})$
$$\left\{UQ_{(cw3)} = \frac{(((UQ_{(c)} * 10) + 2^{|UQ_{(ctc)}|*|UQ_{(ctc)}|}) * 2) + |U_{(ct)} - UQ_{(c)}| * 100)}{10}; UQ_{((cw))} = UQ_{(cw3)}\right\}$$

ELSE IF $(UQ_{(ctc)} < 0 \ \& \ UQ_{(c)} < U_{(ct)})$
$$\left\{UQ_{(cw4)} = \frac{(UQ_{(c)} * 10) + 2^{|UQ_{(ctc)}|*|UQ_{(ctc)}|}}{10}; UQ_{(cw)} = UQ_{(cw4)}\right\}$$

FIG. 31 illustrates how $UQ_{(cw)}$ varies when the Certainty Threshold is 80% ($U_{(ct)}$). FIG. 32 illustrates how $UQ_{(cw)}$ varies when the Certainty Threshold is 50% ($U_{(ct)}$). The columns of FIG. 31 and FIG. 32 indicate a user's reported level of confidence ($U_{(c)}$). The rows of FIG. 31 and FIG. 32 indicate a particular $UQ_{(ctc)}$ value. Further, the cells in FIG. 31 and FIG. 32 indicate a particular $UQ_{(cw)}$ calculated using the equation above depending on the values of $U_{(c)}$, $UQ_{(ctc)}$, and $U_{(ct)}$. As discussed above, the Certainty Threshold, whether a predetermined system-wide setting or an individually determined value, is an estimate of the degree of certainty at which an individual is likely to act on information that the individual believes to be correct.

In embodiments, a positive $UQ_{(cw)}$ will increase $UQ_{(sw)}$ (stacking weight), and a negative $UQ_{(cw)}$ will decrease $UQ_{(sw)}$. Accordingly, in embodiments, the larger the $UQ_{(cw)}$ value is, the more likely it is that an ILAT running in Certainty Mode will present the question to the user again in the near future. The smaller the $UQ_{(cw)}$ value is, the less likely it is that the ILAT will present the question to the user again in the near future. For example, referring to FIG. 31, a user who responds correctly to a question for the second consecutive time and reports an 85% certainty level has $UQ_{(sw)}$ decrease by 0.40, thus decreasing the likelihood that the user will see this question again in the near future. However, had the user answered incorrectly for the first time at a certainty level of 85% $UQ_{(sw)}$ would increase by 2.60, thus increasing the likelihood that the user will see this question again in the near future.

As illustrated in FIG. 31 and FIG. 32, if the user consecutively answers a question correctly and reports a high level of confidence (upper right quadrant), UQ(cw) decreases in value, which decreases the likelihood that the user will see the question again. If the user consecutively answers the question incorrectly and reports a level of confidence lower than $U_{(ct)}$, $UQ_{(cw)}$ increases in value by a relatively small degree, which somewhat increases the likelihood that the user will see the question again. An incorrect response with $UQ_{(c)}$ higher than $U_{(ct)}$ increases $UQ_{(cw)}$ by a more substantial degree, which significantly increases the likelihood that the user will see the question again. As further illustrated in FIG. 31 and FIG. 32, if a user answers a question incorrectly five times in a row, the user is more likely to see the question again if the user reports a high level of certainty compared to if the user reports a low level of certainty. Accordingly, a goal of the system is that the users' responses tend toward the upper right quadrant of FIG. 31 and FIG. 32 and away from the lower left quadrants.

Figure 33:
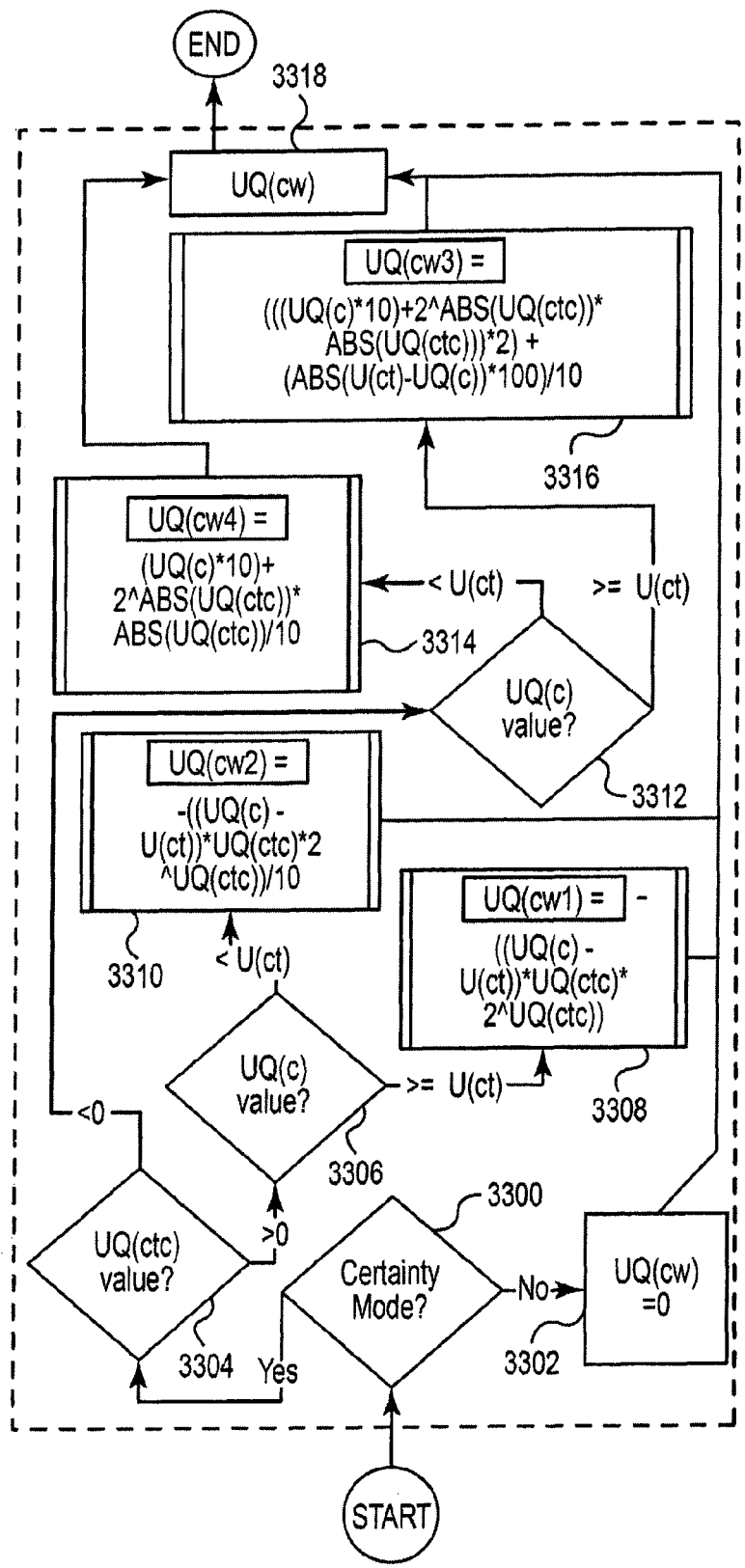
FIG. 33 illustrates an example process for calculating $UQ_{(cw)}$.

FIG. 33 illustrates an example process of calculating $UQ_{(cw)}$. The process starts at 3300 to determine if the system is in Certainty Mode. If the system is not in Certainty Mode, process flow proceeds from 3300 to 3302 to set $UQ_{(cw)}$ to zero. That is, when not in Certainty Mode, $UQ_{(cw)}$ has no affect on $UQ_{(sw)}$. If the system is in Certainty Mode, process flow proceeds from 3300 to 3304 to determine if $UQ_{(ctc)}$ is above or below zero. If $UQ_{(ctc)}$ is above zero, process flow proceeds from 3306 to determine if $UQ_{(c)}$ is greater than or equal to $U_{(ct)}$. If $UQ_{(c)}$ is greater than or equal to $U_{(ct)}$ (i.e., the user's reported confidence level is greater than or equal to the Certainty Threshold), process flow proceeds from 3306 to 3308 to calculate $UQ_{(cw1)}$ as indicated above. If $UQ_{(c)}$ is less than $UQ_{(ctc)}$ (i.e., the user's reported confidence level is less than the Certainty Threshold), process flow proceeds from 3306 to 3310 to calculate $UQ_{(cw2)}$ as indicated above.

If $UQ_{(ctc)}$ is less than zero, process flow proceeds from 3304 to 3312 to determine if $UQ_{(c)}$ is greater than or equal to $U_{(ct)}$. If $UQ_{(c)}$ is greater than or equal to $U_{(ct)}$, process flow proceeds from 3312 to 3316 to calculate $UQ_{(cw3)}$ as indicated above. If $UQ_{(c)}$ is less than $U_{(ct)}$, process flow proceeds from 3312 to 3314 to calculate $UQ_{(cw4)}$ as indicated above. Process flow proceeds from 3308, 3310, 3314, or 3316 to 3318 to store $UQ_{(cw)}$. In embodiments, $UQ_{(cw)}$ can be stored in the user history response database 310 (FIG. 3). In embodiments, the evaluation module (410) performs the process illustrated in FIG. 33.

Calculating UQ(fpp)

As discussed above, $UQ_{(fpp)}$ (User-Question False Positive Probability, is an estimate of the likelihood that a response to a question is a false positive. $UQ_{(fpp)}$ may be a value with two decimal places ranging between 0.00 and 1.00. In embodiments, when not running in Certainty Mode, $UQ_{(fpp)}$ equals:

$$UQ_{(fpp)} = \text{MIN}(\text{MAX}(UQ_{(fpp1)} + UQ_{(fpp2)} + UQ_{(fpp3)}, 0), 0.99)$$

Figure 34:
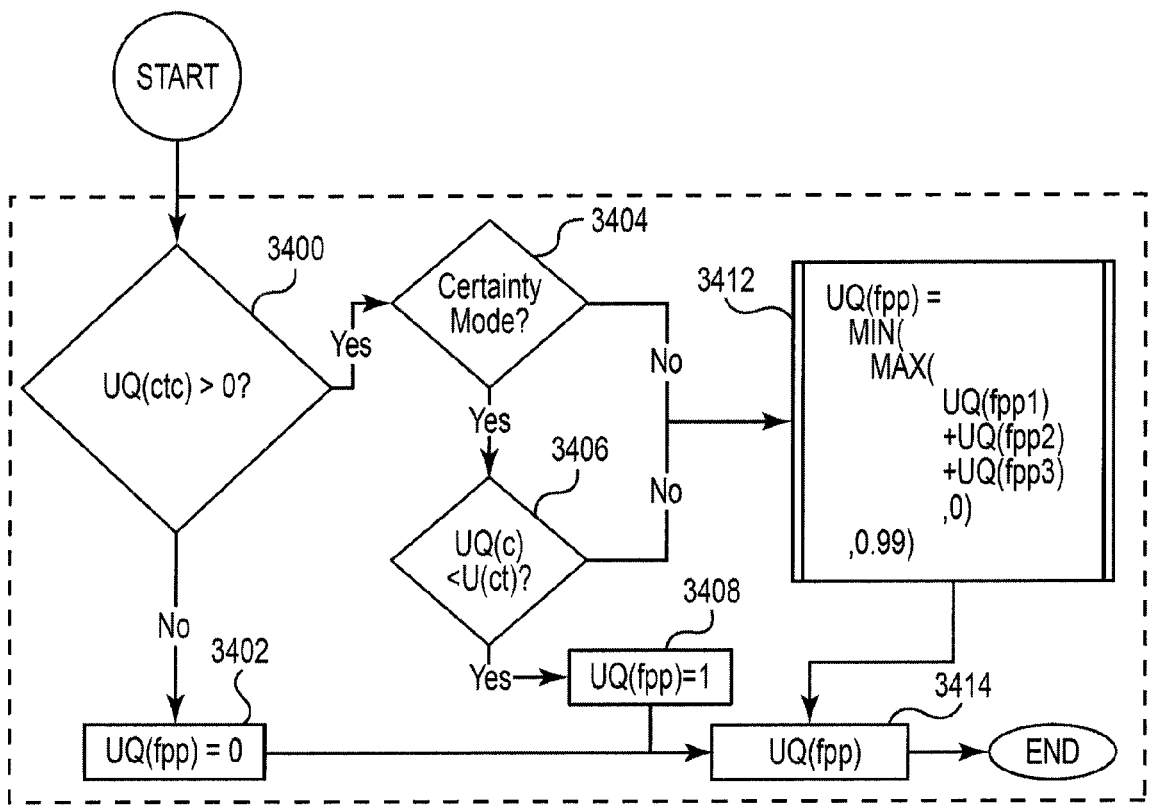
FIG. 34 illustrates an example process for calculating $UQ_{(fpp)}$.

FIG. 34 shows an example process for determining $UQ_{(fpp)}$. The process starts at 3400 to determine if $UQ_{(ctc)}<0$. If $UQ_{(ctc)}<0$, process flow proceeds from 3400 to 3402 to set $UQ_{(fpp)}$ to 0. As an example, if $UQ_{(ctc)}<0$, the current response to the question is incorrect, which means that the response cannot be a false positive. Process flow proceeds from 3402 to 3414 to store $UQ_{(fpp)}$.

If $UQ_{(ctc)}>0$, process flow proceeds from 3400 to 3404 to determine if the system is running in Certainty Mode 3404. If the system is running in Certainty Mode, process flow proceeds from 3404 to 3406 to determine if $UQ_{(c)}<U_{(ct)}$. Accordingly, if the user's reported level of confidence is less than the Certainty Threshold, process flow proceeds from 3406 to 3408 where the user's response is treated as a definite false positive and $UQ_{(fpp)}=1$. If the user's reported level of confidence is greater than or equal to the Certainty Threshold, process flow proceeds from 3406 to 3412 to determine $UQ_{(fpp)}$ using $UQ_{(fpp1)}$, $UQ_{(fpp2)}$, and $UQ_{(fpp3)}$ as indicated above. Process flow proceeds from 3408 and 3410 to 3414 to store $UQ_{(fpp)}$.

If the system is not running in Certainty Mode, process flow proceeds from 3404 to 3412 to determine $UQ_{(fpp)}$ using $UQ_{(fpp1)}$, $UQ_{(fpp2)}$, and $UQ_{(fpp3)}$ as indicated above. Process flow proceeds from 3412 to 3414 to store $UQ_{(fpp)}$. $UQ_{(fpp)}$ may be stored in the user history response database 310 (FIG. 3). In embodiments, the evaluation module 410 (FIG. 4) performs the process illustrated in FIG. 34.

Calculating UQ(sw)

As discussed above, $UQ_{(sw)}$ is a stacking weight associated with a question where an increase in $UQ_{(sw)}$ increases the likelihood that the question will be re-presented to a user. In embodiments, UQ(sw) may be determined from the following equation:

$$\text{IF } (UQ_{(ctc)} > 0)\{UQ_{(sw1)} = (UQ_{(ctc)}^{Q(ctc)})*(-1)) + UQ_{(fpp)} + UQ_{(cw)}\};$$
$$UQ_{(sw)} = UQ_{(sw1)}\}$$
$$\text{ELSE IF } (UQ_{(ctc)} < 0)\{UQ_{(sw2)} = |UQ_{(ctc)}|^{UQ(ctc)}; UQ_{(sw)} = UQ_{(sw2)}\}$$

Figure 35:
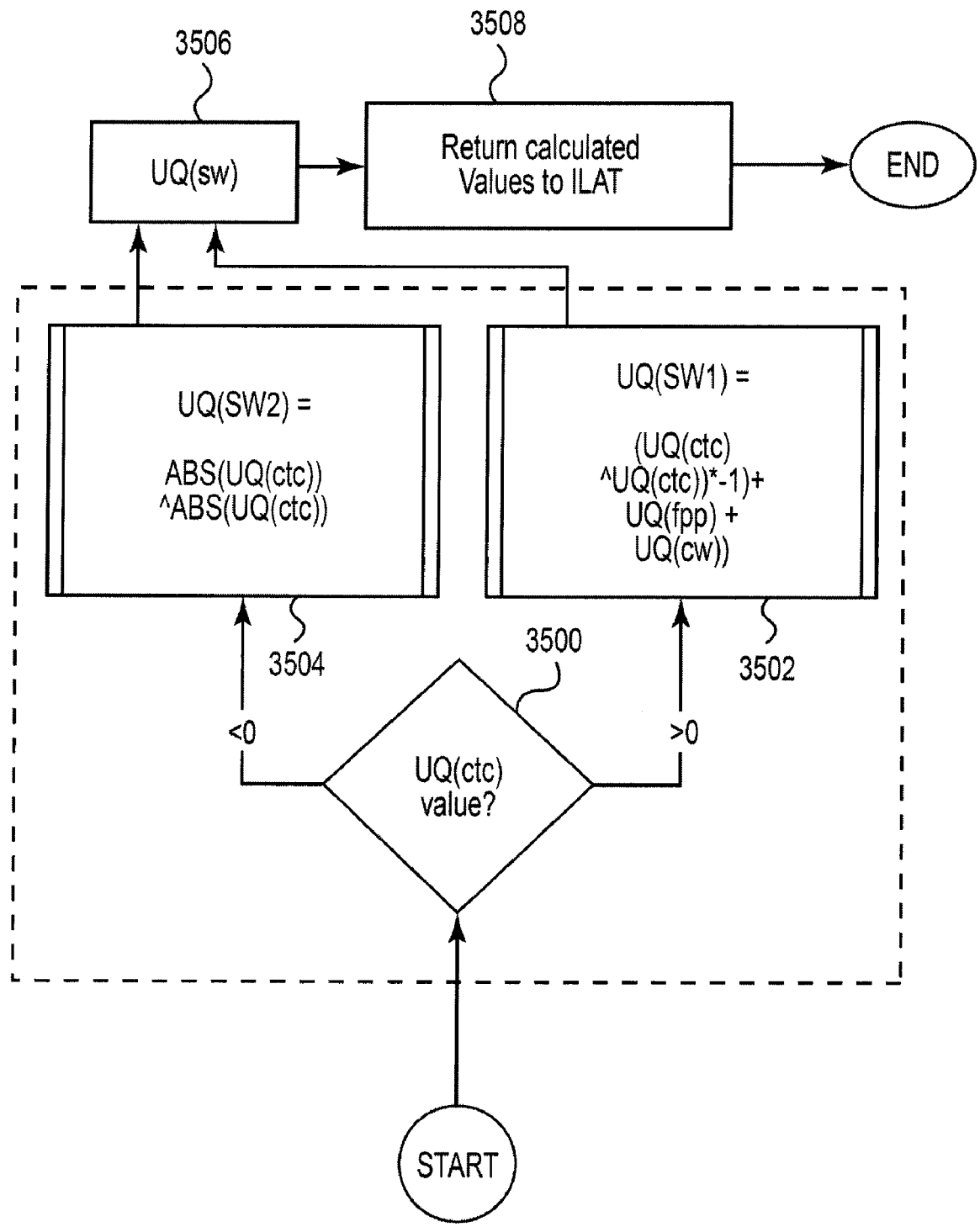
FIG. 35 illustrates an example process for calculating $UQ_{(sw)}$.

FIG. 35 illustrates an example process for determining $UQ_{(sw)}$. The process starts at 3500 to determine if $UQ_{(ctc)}>0$. If $UQ_{(ctc)}$ is >0, process flow proceeds from 3500 to 3502 to determine $UQ_{(sw1)}$ as indicated above. Process flow proceeds from 3502 to 3506 to store $UQ_{(sw1)}$ as $UQ_{(sw)}$. If $UQ_{(ctc)}$ is <0, process flow proceeds from 3500 to 3504 to determine $UQ_{(sw2)}$ according to the equation above. Process flow proceeds from 3504 to 3506 to store $UQ_{(sw2)}$ as $UQ_{(sw)}$. Process flow proceeds from 3506 to 3508 to return $UQ_{(sw)}$ to the ILAT. $UQ_{(sw)}$ may be stored in the user's history response database 310 (FIG. 3). In embodiments, the evaluation module 410 (FIG. 4) performs the process illustrated in FIG. 35.

Figure 36:
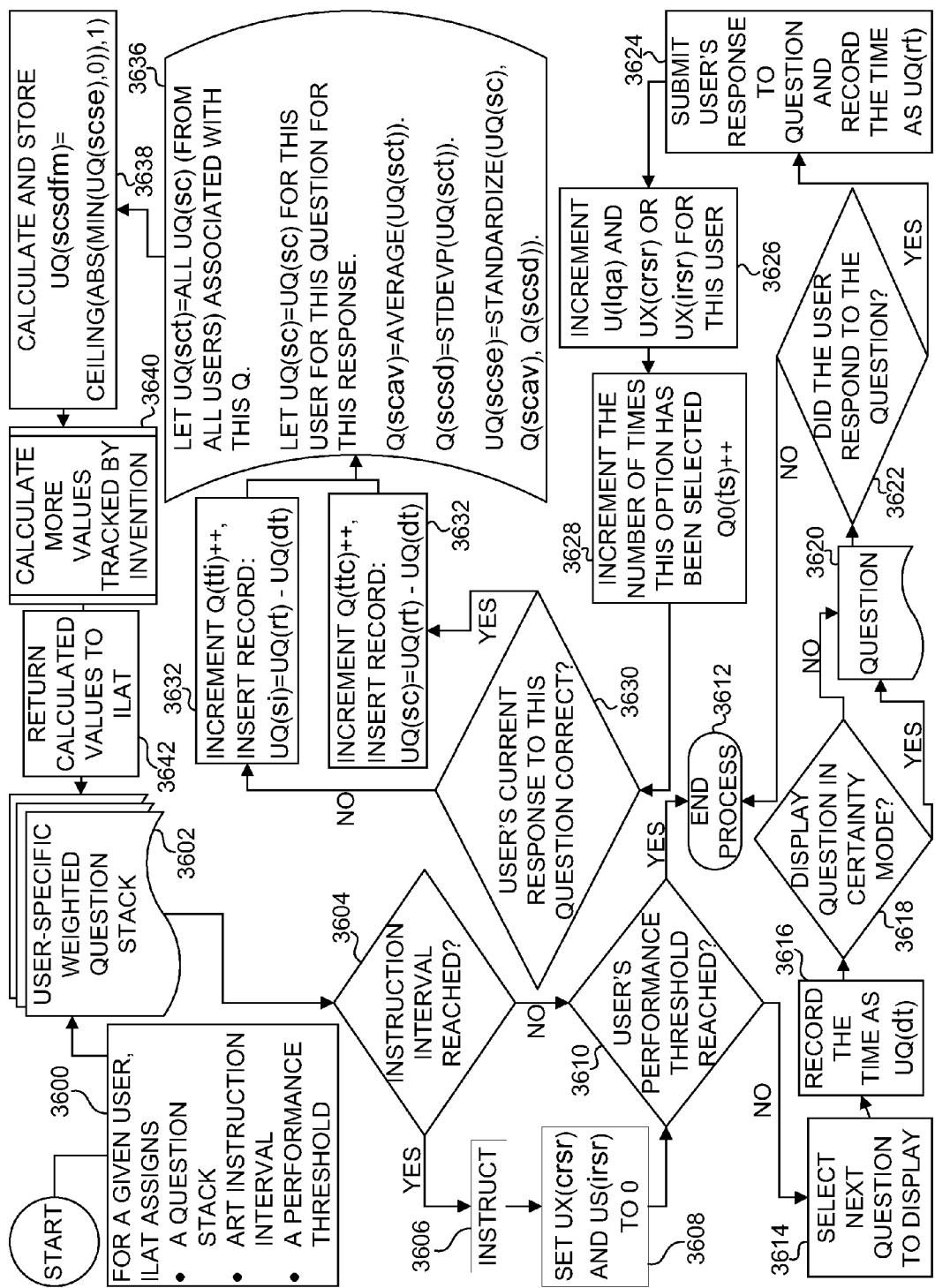
FIG. 36 illustrates an example process for calculating a recommended stacking weight and its constituent operands.

FIG. 36 illustrates an example process calculating a recommended stacking weight and its constituent operands. The steps highlighted in black illustrates steps described in FIG. 1. As discussed above, any mechanism or device that determines one or more operands to determine $UQ_{(fpp)}$ and/or $UQ_{(sw)}$ may be external to an ILAT or, alternatively, may be incorporated as part of the ILAT. In embodiments, the process illustrated in FIG. 36 uses and updates the variables $UX_{(crsr)}$ (User Course-Lesson-Module Correct Responses Since Remediation) and $UX_{(irsr)}$ (User Course-Lesson-Module Incorrect Responses Since Remediation). $UX_{(crsr)}$ represents the total number of correct responses that a user has made since the last instructional interval was reached. $UX_{(irsr)}$ represents a total number of incorrect responses that a user has made since the last instructional interval was reached. X refers to the container of the question such as Course and/or Lesson and/or Module and/or any other desired identifier.

The process begins at 3600 where at least a question stack, an instruction interval, and a performance threshold are assigned as described above. Process flow proceeds from 3600 to 3602 where the user receives a question stack as previously described. Process flow proceeds from 3602 to 3604 to determine if the instruction interval reached is reached as previously described. If the instruction interval is reached, process flow proceeds from 3604 to 3606 to instruct the user as previously described. Process flow proceeds to 3608 to set $UX_{(crsr)}$ and $UX_{(irsr)}$ to 0 since the instruction interval is reached. Process flow proceeds to 3610 to determine if the user's performance threshold is reached as previously described. If the instruction interval is not reached, process flow also proceeds from 3604 to 3610. If the user's performance threshold is reached, the process ends 3612.

If the user's performance threshold is not reached, process flow proceeds from 3610 to 3614 where the next question is selected for display as previously described. Process flow proceeds to 3616 to record the current time as the display time ($UQ_{(dt)}$) of the selected question. Process flow proceeds to 3618 to determine if the selected question should be displayed in Certainty Mode as previously described. Upon determining whether the selected question should be displayed in Certainty Mode, process flow proceeds to 3620 to display the selected question and determine if a response is received for the selected question 3622 as previously described.

If no response is received for the selected for the displayed question (e.g., as determined by the expiration of a time limit, or the user exiting the course, etc.), the process ends. If a response is received for the selected question, process flow proceeds from 3622 to 3624 where the user's response to the selected question is submitted, and the time that the response is received is recorded as $UQ_{(rt)}$. Process flow proceeds to 3624 to increment the total number of questions answered by the user ($U_{(tqa)}$). Additionally $UX_{(crsr)}$ or $UX_{(irsr)}$ depending on whether the received response is correct or incorrect, respectively. Process flow proceeds to increment $QO_{(ts)}$ to indicate the number of times the user's current response is selected.

Process flow proceeds to 3630 to determine if the user's current response is correct. If the user's current response is not correct, process flow proceeds from 3630 to 3632 to increment the total number of times the question has been answered incorrectly ($Q_{(tti)}$), and record the time that it took to answer the question incorrectly ($UQ_{(si)}$). If the user's current response is correct, process flow proceeds from 3630 to 3634 to increment the total number of times the question has been answered correctly ($Q_{(ttc)}$), and record the time that it took to answer the question correctly ($UQ_{(sc)}$). Process flow proceeds from 3632 or 3634 to 3636 to update the variables $UQ_{(sct)}$, $UQ_{(sc)}$, $Q_{(scav)}$, $Q_{(scsd)}$, and $UQ_{(scse)}$ as described above to determine how quickly the user responded to the question compared to other users.

Process flow proceeds from 3636 to 3638 to determine $UQ_{(scsdfm)}$ as described above. Process flow proceeds to 3640 to calculate one or more operands, described below, used to determine the likelihood that the user's correct response to the selected question is a false positive (among other operands described above), and determine the recommended stacking weight of the question. Process flow proceeds to 3642 to return calculated values to the ILAT.

Figure 37:
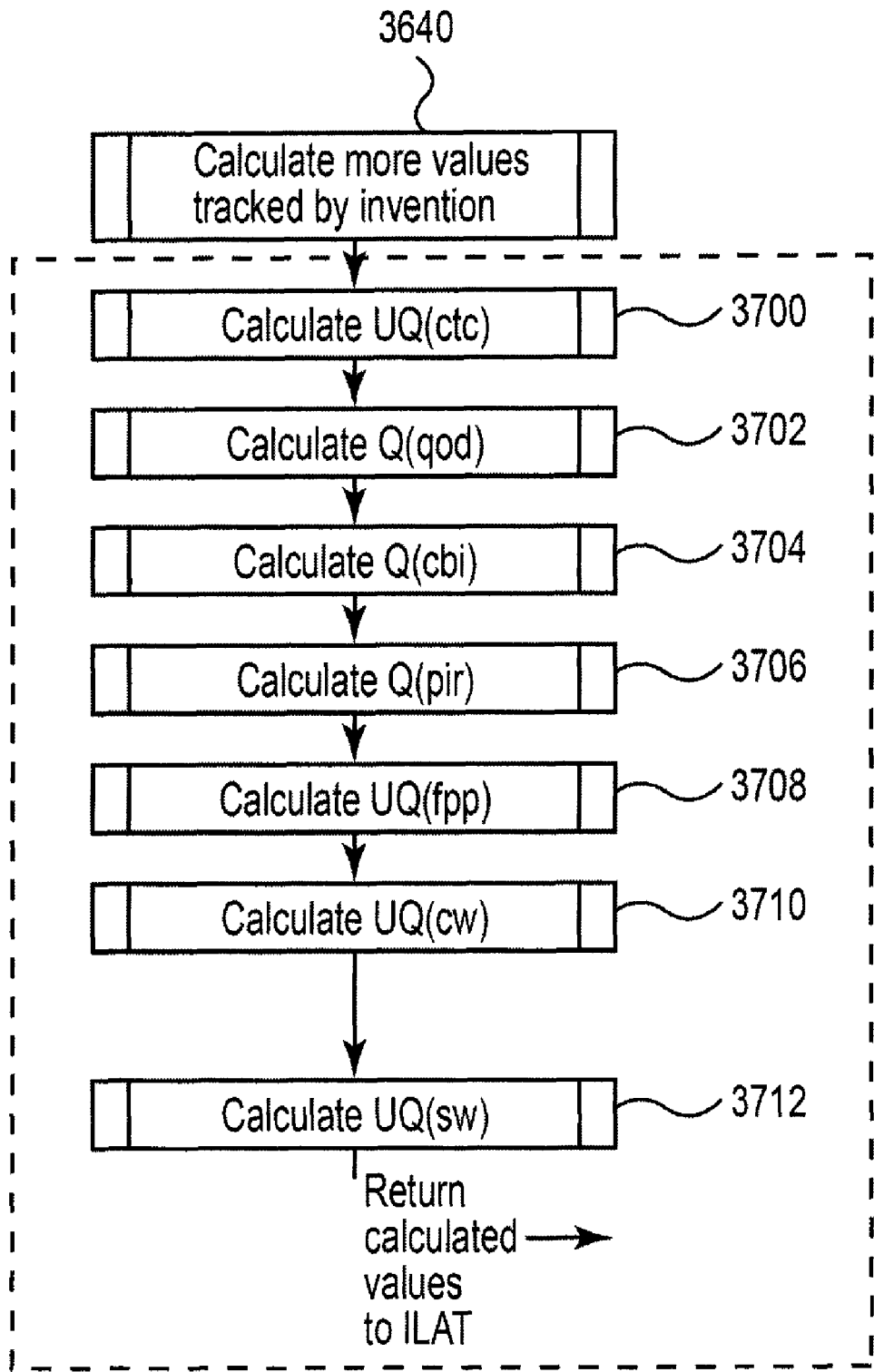
FIG. 37 illustrates one or more operands determined by the process illustrated in FIG. 36.

FIG. 37 illustrates one or more operands determined by the process illustrated in FIG. 36 at 3638. The operands include, but are not limited to, $UQ_{(ctc)}$ 3700, $Q_{(qod)}$ 3702, $Q_{(cbi)}$ 3704, $Q_{(pir)}$ 3706, $UQ_{(fpp)}$ 3708, $UQ_{(cw)}$ 3710, and $UQ_{(sw)}$ 3712.

Support for Diverse Types of Questions

In embodiments, to support problem types other than the selection of an option or option set from a larger option set (as in true/false or multiple-choice questions), options of a question may be any desired response type. For example, suppose a question is "The Spanish word for 'cat' is _____." In this case, the respondent is required to type the answer to the question, as opposed to selecting the correct answer from a list.

FIG. 38 illustrates an example properties list for $Q_7$, which is a fill in the blank question type. Values for $Q_{(to)}$ and $Q_{(sT)}$ are set to 0. In embodiments, $Q_{(prc)}$ is estimated and manually input by the author or editor of the question as a value that is in a range not less than 0 and not greater than 50 (i.e. not greater than the $Q_{(prc)}$ of a True/False question).

In embodiments, an answer option value for $Q_7$ could be a single word, or an array, or any desired value representative of the correct response to the question. For example, if $Q_7$ is a software simulation, $Q_7O_1$ may be used to store a target frame number of a movie, or "correct state" variable, or a set of acceptable paths to arrive at an end state of a branching exercise, etc. That is, the programming logic of an interactive question type is free to determine whether a response meets the criteria for a particular option to have been "selected" and whether to direct the system to increment the $Q_{(ts)}$, $Q_{(ttc)}$, and $Q_{(tti)}$ values for that question. In embodiments, however, values for $Q_{(cbi)}$ and $Q_{(pir)}$ are updated by the invention whenever $Q_{(ttc)}$ or $Q_{(tti)}$ are updated.

In embodiments, an answer option to a question is any desired mechanism suitable for receiving an appropriate response to the question based on the type of question.

For example, if the question is a fill-in-the blank question type, an answer option for this question can be a single word. As another example, if the question is a short answer question type, an answer option for this question can be a paragraph consisting of one or more sentences.

Maintaining Granular Data on Questions, Options, Responses and Respondents

In embodiments, a record of all a respondent's responses to a question is maintained. FIG. 39 illustrates example data of User 1's response to Question 3. Options selected by User 1 are designated by 1s in the Response column, whereas options not selected are designated by 0s. A selection (or lack of selection) that is correct may be designated by a 1 in the Response Correctness column. A selection (or lack of selection) which is incorrect may be designated by a 0 in the Response Correctness column. As illustrated in FIG. 39, User 1 selected $O_2$ for Question 3, but did not select $O_1$, $O_3$, and $O_4$. As further illustrated in FIG. 39, the non-selection of $O_3$ and $O_4$ is correct, while the non-selection of $O_1$ and selection of $O_2$ is incorrect. In embodiments, the Response Correctness is not stored since this value may be calculated in real time.

Suppose that the ILAT presents $Q_3$ for a second time to User 1. This time, as illustrated in FIG. 40, User 1 incorrectly selects $O_3$. In embodiments, values in the id column are auto-incremented so that an order of responses can be compiled. For example, as illustrated in FIG. 40, the second response to $O_3$ is recorded, but the order of those responses can be determined by their auto-incremented id (i.e. $id_{(3)}$ precedes $id_{(7)}$). That is, the first time Question 3 was presented to User 1, $id_{(3)}$ in FIG. 39 indicates that User 1 did not select $O_3$. However, the second time Question 3 was presented to User 1, $id_{(7)}$ of FIG. 40 indicates that User 1 selected $O_3$. Any other desired ordering mechanism (e.g. a timestamp) can be used in place of the "id" column.

In embodiments, multiple responses of multiple respondents for multiple questions of diverse question types are stored as illustrated in FIG. 41. As illustrated in FIG. 41, the response column stores inputted responses to a fill-in-the-blank type question.

Control Panel

In embodiments, a control panel is provided to an administrator of an ILAT. FIGS. 42A-B illustrate an example control panel. As illustrated in FIGS. A-B, the control panel permits the administrator to select which operands the system will return back to the ILAT. The control panel also permits the administrator to enable or disable the Certainty Mode, and to set a Default Certainty Threshold $S_{(ct)}$. In embodiments, the tuner module 414 (FIG. 4) implements the control panel illustrated in FIGS. 42A-B. The following is a non-exclusive list of variables listed in the control panel (FIGS. 42A-B):

$Q_{(cbi)}$ Question: Correct Before Incorrect
  The sum of all $UQ_{(cbi)}$ for a given question.

$Q_{(dde)}$ Question: Distracter Deviation from Expected Percentage of Selections
The sum of all $QO_{(dde)}$ for a given question.

$Q_{(ec)}$ Question: Expected Correct
For a given question option, $Q_{(ec)}$ is the percentage of the number of times that the correct options are expected to be selected if all question options are equally believable to be correct. $Q_{(ec)} = Q_{(tco)}/Q_{(to)}$.

$Q_{(pir)}$ Question: Percentage of Incorrect Responses
Of the total number of respondents' responses to a problem, $Q_{(pir)}$ is the percentage of those responses that are incorrect or considered false positives, expressed as a decimal.

$Q_{(prc)}$ Question: Percent Random Chance
The percent random chance of selecting a correct response to a question.

$Q_{(qod)}$ Question: Quality of Distracters
A measure of the quality of a question's distracters, measured on a scale between 0 (abysmal) and 1 (superb).

$Q_{(sc)}$ Question: Seconds to Correct
A set of values consisting of all $UQ_{(sc)}$ for a given question.

$Q_{(scav)}$ Question: Seconds to Correct Average
The average value of $Q_{(sc)}$.

$Q_{(scsd)}$ Question: Seconds to Correct Standard Deviation
The standard deviation of $Q_{(sc)}$.

$Q_{(si)}$ Question: Seconds to Incorrect
A set of values consisting of all $UQ_{(si)}$ for a given question.

$Q_{(siav)}$ Question: Seconds to Incorrect Average
The average value of $Q_{(si)}$.

$Q_{(sisd)}$ Question: Seconds to Incorrect Standard Deviation
The standard deviation of $Q_{(si)}$.

$Q_{(sl)}$ Question: Selection Limit
Represents a limit on the number of answer options that a user is allowed to or instructed to select.

$Q_{(tco)}$ Question: Total Correct Options
For a set of options associated with a question, $Q_{(tco)}$ is the total number of options that are correct.

$Q_{(tcos)}$ Question: Total Correct Options Selected
For a given question, $Q_{(tcos)}$ is the total number of correct options selected.

$Q_{(tio)}$ Question: Total Incorrect Options
For a set of options associated with a question, $Q_{(tio)}$ is the total number of options that are incorrect.

$Q_{(tios)}$ Question: Total Incorrect Options Selected
For a given question, $Q_{(tios)}$ is the total number of incorrect options selected.

$Q_{(to)}$ Question: Total Options
Represents the total number of answer options associated with a question.
This is an important value for calculating $Q_{(prc)}$.

$Q_{(tos)}$ Question: Total Options Selected
For a given question, $Q_{(tos)}$ is the sum of all $QO_{(ts)}$.

$Q_{(ttc)}$ Question: Total Times Correct
The total number of times that a correct response has been submitted for a question.

$Q_{(tti)}$ Question: Total Times Incorrect
The total number of times that an incorrect response has been submitted for a question.

$QO_{(b)}$ Question-Option: Believability
For a given question option, $QO_{(b)}$ is the percentage of the time that this option is actually selected. $QO_{(b)} = QO_{(ts)}/Q_{(tos)}$.

$QO_{(c)}$ Question-Option: Correct
This value designates whether an answer option is correct or incorrect.

$QO_{(dde)}$ Question-Option: Distracter Deviation from Expected Percentage of Selections
In embodiments, the following equation applies to distracters only. If the answer option is correct, then $QO_{(dde)} = 0$.
IF $(QO_{(eps)} - QO_{(b)} > 0)$ THEN $\{QO_{(dde)} = QO_{(eps)} - QO_{(b)}\}$ ELSE $\{QO_{(dde)} = 0\}$ $QO_{(eps)}$ Question-Option: Expected Percentage of Selections
For a given question option, $QO_{(eps)}$ is the percentage of the number of times that the option is expected to be selected if all question options are equally believable to be correct. $QO_{(eps)} = 1/Q_{(to)}$.

$QO_{(ts)}$ Question-Option: Times Selected
Designates the total number of times that an answer option has been selected.

$S_{(ct)}$ System: Certainty Threshold
When running in Certainty Mode, $S_{(ct)}$ is a value for a degree of certainty below which any correct response by any user is treated as a false positive.

$U_{(ct)}$ User: Certainty Threshold
When running in Certainty Mode, $U_{(ct)}$ is a value for a degree of certainty below which any correct response by a particular user is treated as a false positive. If no $U_{(ct)}$ is specified, $U_{(ct)} = S_{(ct)}$.

$U_{(gfc)}$ User: Guess/Forget Count
The total number of definite false positives logged by the system for a particular user.

$U_{(tgf)}$ User: Tendency to Guess or Forget
$U_{(tgf)} = U_{(gfc)}/U_{(tqa)}$.

$U_{(tqa)}$ User: Total Questions asked
The total number of questions that have been displayed to a particular user.

$UQ_{(c)}$ User-Question: Certainty
A user's reported level of certainty that a submitted response is correct.

$UQ_{(cr)}$ User-Question: Correctness
Indicates whether a user's response to a question was correct or incorrect.

$UQ_{(cbi)}$ User-Question: Correct Before Incorrect
A count of the number of times that a respondent correctly responds to a problem prior to incorrectly responding to that problem.

$UQ_{(ctc)}$ User-Question: Consecutive Times Correct
The number of times that a user's chronological history of responses to a question terminates with one or more consecutive correct responses (in which case $UQ_{(ctc)}$ is expressed as a positive integer), or one or more consecutive incorrect responses (in which case $UQ_{(ctc)}$ is expressed as a negative integer).

$UQ_{(cw)}$ User-Question: Certainty Weight
When run in Certainty Mode, given $UQ_{(c)}$, $U_{(ct)}$, and $UQ_{(ctc)}$, $UQ_{(cw)}$ is a calculated value that raises or lowers $UQ_{(fpp)}$ and $UQ_{(sw)}$.

$UQ_{(dt)}$ User-Question: Display Time
A timestamp of when an instance of a question was displayed to a user.

$UQ_{(fpp)}$ User-Question: False Positive Probability
Estimates the probability that a response to a question is a false positive.

$UQ_{(rca)}$ User-Question: Response Correctness Array
A chronological history of correctness of a learner's set of responses to a question.

$UQ_{(rt)}$ User-Question: Response Time
A timestamp of when an instance of a question was responded to by a user.

$UQ_{(sc)}$ User-Question: Seconds to Correct
An amount of time that has passed between a question being displayed to a user and the user answering the question correctly.

$UQ_{(scsdfm)}$ User-Question: Seconds to Correct, Standard Deviations from the Mean=CEILING(ABS(MIN($UQ_{(scse)}$, 0)),1)

$UQ_{(scse)}$ User-Question: Seconds to Correct, Normalized Value

The normalized value of a $UQ_{(sc)}$ given $Q_{(sc)}$ for that question where $$Z = \frac{X - \mu}{\sigma}.$$

$UQ_{(si)}$ User-Question: Seconds to Incorrect

An amount of time that has passed between a question being displayed to a user and the user answering the question incorrectly.

$UQ_{(sw)}$ User-Question: Recommended Stacking Weight

A value that combines $UQ_{(ctc)}$, $UQ_{(sw)}$, and $UQ_{(fpp)}$.

$UQ_{(ttc)}$ User-Question: Total Times Correct

The total number of times that a specific user has submitted a correct response for a specific question.

$UQ_{(tti)}$ User-Question: Total Times Incorrect

The total number of times that a specific user has submitted an incorrect response for a specific question.

$UQO_{(r)}$ User-Question-Option: Response

A user's response to a question option.

$UQO_{(rc)}$ User-Question-Option: Response Correctness

The correctness of a user's response to a question option.

$UX_{(crsr)}$ User (Course-Lesson-Module) Correct Responses Since Remediation

The total number of responses that a user has made since the last instructional interval was reached.

$UX_{(irsr)}$ User (Course-Lesson-Module) Incorrect Responses Since Remediation

The total number of responses that a user has made since the last instructional interval was reached.

Example Computing Device

Embodiments of the present invention include various steps, which are described herein. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware or human representatives of the parties or entities involved in the transaction.

Figure 43:
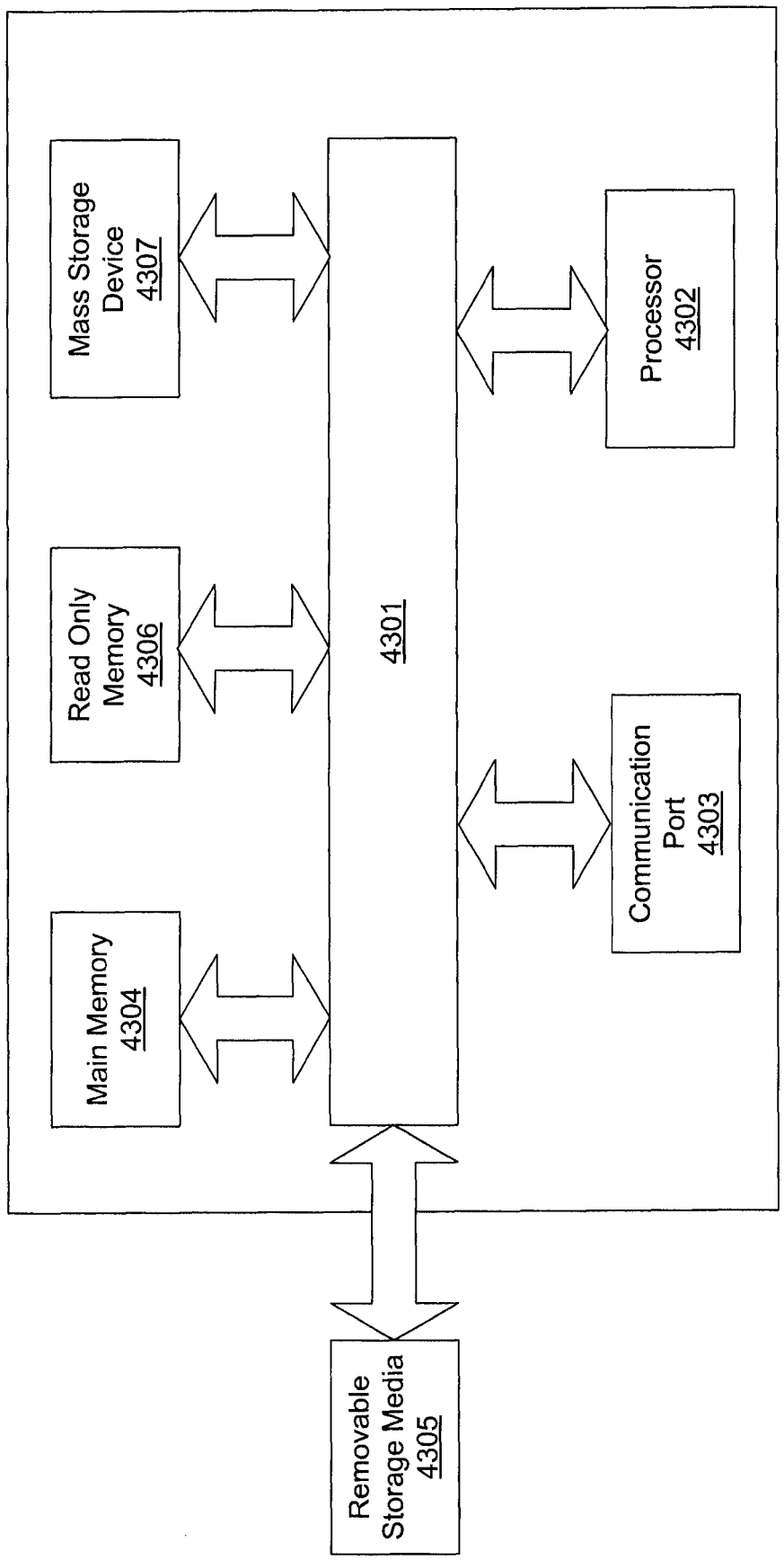
FIG. 43 illustrates an example computing device.

FIG. 43 is a schematic diagram of a computing device 4300 upon which the learning center 200 (FIG. 2) and/or other aspects of FIG. 2 may execute. In embodiments, the computing device is, for example, configured to perform the process illustrated in FIG. 36.

In embodiments, the computing device 4300 includes a bus 4301, at least one processor 4302, at least one communication port 4303, a main memory 4304, a removable storage media 4305 a read only memory 4306, and a mass storage 4307. Processor(s) 4302 can be any know processor, such as, but not limited to, an Intel® Itanium® or Itanium 2® processor(s), or AMD® Opteron® or Athlon MP® processor(s), or Motorola® lines of processors.

Communication port(s) 4303 can be any known communications conduit such as, but not limited to, an RS-232 port for use with a modem based dialup connection, a 10/100 Ethernet port, or a Gigabit port using copper or fiber. In embodiments, the processor 4302 can be configured to execute the modules illustrated in FIG. 4.

Communication port(s) 4303 may be chosen depending on a network such as a Local Area Network (LAN), Wide Area Network (WAN), or any desired network to which the computing device 4300 connects. The computing device 4300 may be in communication with peripheral devices such as, but not limited to, printers, speakers, cameras, microphones, or scanners.

Main memory 4304 can be Random Access Memory (RAM), or any other desired storage device(s). Read only memory 4306 (ROM) can be any suitable storage device(s) such as, but not limited to, Programmable Read Only Memory (PROM) chips for storing static information such as instructions for processor 4302. In embodiments, the ROM 4306 can be configured to store any information in the databases illustrated in FIG. 3.

Mass storage 4307 can be used to store information and instructions. For example, hard disks such as the Adaptec® family of SCSI drives, an optical disc, an array of disks such as RAID, such as the Adaptec family of RAID drives, or any other mass storage devices may be used. In embodiments, the main memory 4304, removable storage media 4305, read only memory 4306, and mass storage 4307 may each comprise of one or more units linked together physically or logically to operate as a single unit.

Bus 4301 communicatively couples processor(s) 4302 with the other memory, storage and communication blocks. Bus 4301 can be a PCI/PCI-X or SCSI based system bus depending on the storage devices used. Removable storage media 4305 can be any kind of external hard-drives, such as, but not limited to, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Embodiments can be implemented using a combination of one or more desired programming languages such as, but not limited to, PHP, MySQL, ASP, HTML, Javascript, and Flash.

Figure 44:
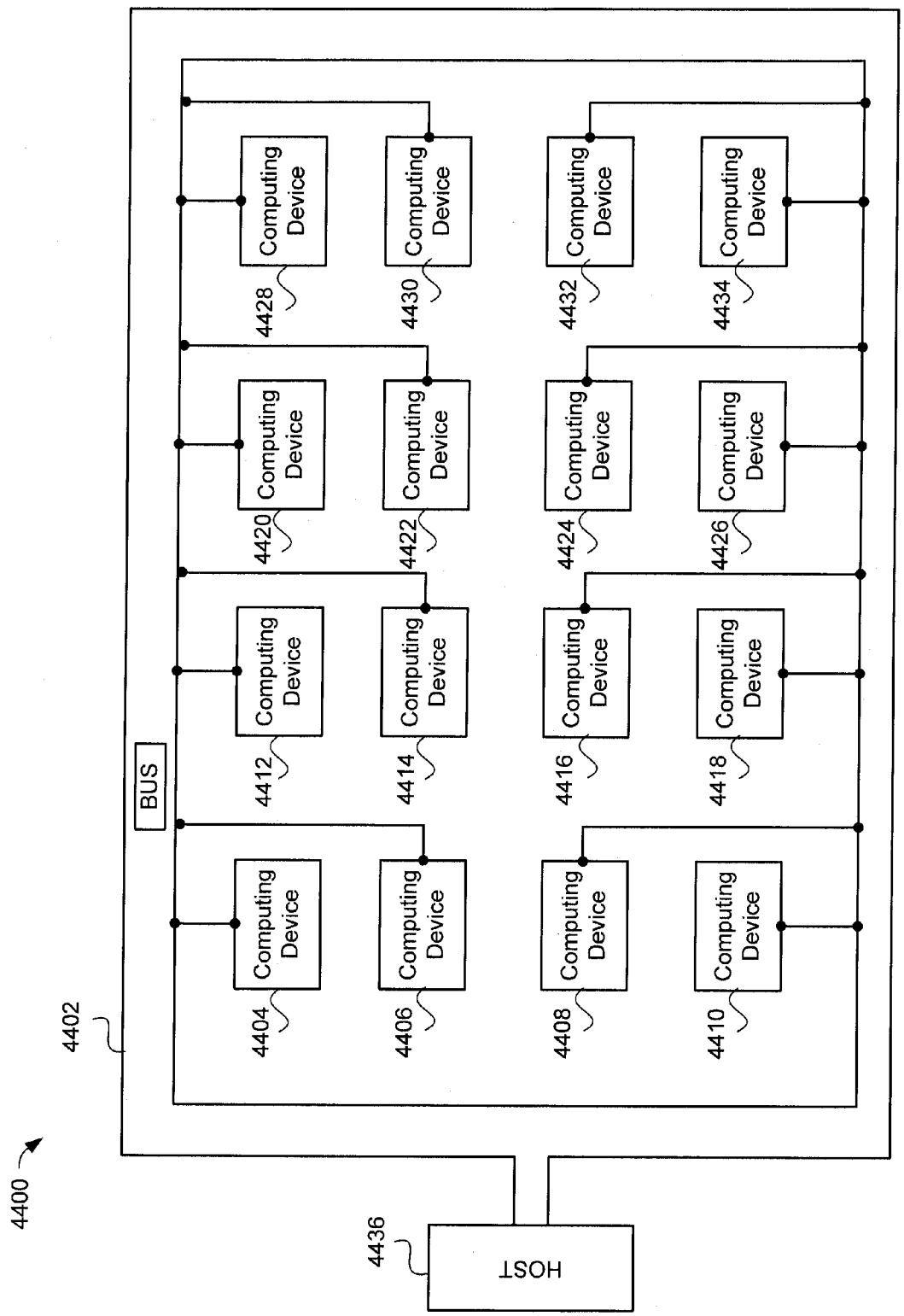
FIG. 44 illustrates an example parallel processing device.

Although a single computing device is illustrated in FIG. 43, embodiments can be extended to one or more systems of computing devices operating in parallel to present questions to one or more users. For example, a first computing device can be dedicated to a first user while a second computing device can be dedicated to a second user where the first and second computing devices perform processes such as the process illustrated in FIG. 36 in parallel. In addition, for any given user, various aspects of processes such as the process of FIG. 36 can each be executed on a different processor. Accordingly, the embodiments can include massive parallel computing systems to accommodate any desired number of users. Example parallel processors include, but are not limited to, the NVIDIA GT 2000 processor and the Intel Xeon processor. As an example, the Xeon process may be used in IBM's System x3650 servers or Fujitsu's Primergy RX600 S4 servers. For example, FIG. 44 illustrates an example parallel processing system 4400. The parallel processing system includes a common bus 4402 configured to connect to one or more systems. The parallel processing system 4400 includes computing devices 4404-4434, with each of the computing devices configured to communicated with each other via a connection to the common bus 4402. In embodiments, each of the computing devices 4404-4434 has a configuration identical to the computing device 4300 (FIG. 43). The parallel processing system 4400 further includes a host 4436 that is connected to the bus 4402. In embodiments, the host is a server configured to control computing devices 4404-4434.

The parallel processing system 4400 may be configured to include any desired number of computing devices.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A computer-based system for assessment driven learning, the system comprising a processor and machine-executable instructions, the system comprising:
    a generator configured to present questions received from a processor to a question presentation device utilizing a question module and a question database having a plurality of questions,
    wherein the plurality of questions are associated with a stacking weight,
    wherein the plurality of questions are ordered according to the stacking weight of each question, and wherein each question presented includes at least one answer option and at least one associated correct response;
    a question property evaluator configured to utilize the question module and question database to determine a likelihood of randomly selecting the at least one associated correct response for each question presented by calculating:
        an inverse of a product of the number of answer options the user is instructed to select and a number of possible combinations of selection and non-selection of the answer options when the number of answer options the user is instructed to select is less than the number of answer options, or
        an inverse of two raised to a power of the number of answer options when the number of answer options the user is instructed to select is greater than or equal to the number of answer options, and
    a question response receiver configured to receive, from a device associated with the user, at least one response to each question presented utilizing a communications module; and
    a question response evaluator configured to, utilizing an evaluation module and a user response history database for each question presented:
        determine, when the at least one response is the at least one associated correct response, a likelihood that the at least one response is a false positive using the question property evaluator, a response history of the user, and a response history of one or more other users, wherein the question response evaluator is further configured to increase the likelihood that the at least one response is a false positive upon an increase in the likelihood of randomly selecting the at least one correct response
        adjust the stacking weight of each question presented within the question database depending at least upon the likelihood that the at least one response to the question is a false positive.

2. The computer-based system according to claim 1, wherein the question response evaluator is further configured to, utilizing the evaluation module and the user response history database for each question presented,
    increase the likelihood that the at least one response is a false positive upon an indication from the user response history that the at least one response is not the at least one associated correct response consecutively one or more times, and
    decrease the likelihood that the at least one response is a false positive upon an indication from the user response history that the at least one response is the at least one associated correct response consecutively one or more times.

3. The computer-based system according to claim 1, wherein for each question presented,
    the question property evaluator is further configured to, utilizing the question module and question database,
        determine an amount of time the user takes to submit the at least one associated correct response, and
        determine, from the response history of the one or more other users the amount of time the user takes to submit the at least one associated correct response, an average response time of the one or more other users and the user to submit the at least one associated correct response, and
    the question response evaluator is further configured to, utilizing the evaluation module and question database, increase the likelihood that the at least one response is a false positive upon determination that the amount of time the user takes to submit the at least one associated correct response is at least one standard deviation below the average response time of the one or more other users and the user to answer to submit the at least one associated correct response.

4. The computer-based system according to claim 3, wherein for each question presented, upon determination that the at least one response is not the at least one associated correct response and the user response history indicates that the user previously submitted the at least one associated correct response,
    the question property evaluator is further configured to, utilizing the question module and the user response history database, remove an amount of time the user took to previously submit the at least one associated correct response from the average response time of the one or more other users and the user to submit the at least one associated correct response.

5. The computer-based system according to claim 1, wherein upon determination that the user is permitted to report a level of confidence for each question presented, the question response evaluator is further configured to, utilizing the evaluation module, set the likelihood that the at least one response is a false positive to a value representative of a definite false positive when the reported level of confidence is less than a certainty threshold.

6. The computer-based system according to claim 1, wherein upon determination that the user is permitted to report a level of confidence in the at least one response for each question presented, the question response evaluator is further configured to, utilizing the evaluation module and user response history database,
    determine a first certainty weight that decreases the stacking weight upon determination that the reported level of confidence is higher than a certainty threshold and upon an indication from the user response history that the at least one response is the at least one associated correct response consecutively one or more times,
    determine a second certainty weight that increases the stacking weight upon determination that the reported level of confidence is lower than the certainty threshold and upon an indication from the user response history that the at least one response is the at least one associated correct response consecutively one or more times, determine a third certainty weight that increases the stacking weight by an amount higher than the second certainty weight upon determination that the reported level of confidence is lower than the certainty threshold and upon an indication from the user response history that the at least one response is not the at least one associated correct response consecutively one or more times, and determine a fourth certainty weight that increases the stacking weight by an amount higher than the third certainty weight upon determination that the reported level of confidence is higher than the certainty threshold and upon an indication from the user response history that the at least one response is not the at least one associated correct response consecutively one or more times.

7. The computer-based system according to claim 1, wherein for each question presented, the question property evaluator is further configured to, utilizing the question module and question database, determine a likelihood of selecting one or more incorrect options, wherein the question property evaluator considers at least a percentage of a number of times that the one or more incorrect options are expected to be selected and a percentage of a number of times that the one or more incorrect options are selected, and the question response evaluator is further configured to, utilizing the evaluation module, increase the likelihood that the at least one response is a false positive upon a decrease in the likelihood of selecting the one or more incorrect options.

8. A computer-implemented method for assessment driven learning, the method comprising:

assigning a question stack to a user, wherein the question stack includes a plurality of questions;

retrieving the question stack from a question database stored in a computer memory;

retrieving, by a question property evaluator, provided by a processor, from the question database, one or more question properties associated with each question presented on a question presentation device, wherein each question presented includes at least one answer option and at least on associated correct response, wherein the one or more question properties indicate at least the number of answer options and a number of answer options the user is instructed to select;

receiving, utilizing a communications module, at least one response to each question presented from a device associated with the user;

estimating, by the question property evaluator utilizing a question module for each question presented, a likelihood of randomly selecting the at least one correct response by calculating an inverse of a product of the number of answer options the user is instructed to select and a number of possible combinations of selection and non-selection of the answer options when the number of answer options the user is instructed to select is less than the number of answer options, or an inverse of two raised to a power of the number of answer options when the number of answer options the user is instructed to select is greater than or equal to the number of answer options;

adjusting, by a question response evaluator utilizing an evaluation module and a user response history database, an associated stacking weight of each question presented depending at least upon a likelihood that the at least one response to the question is a false positive, wherein the plurality of questions are ordered according to the associated stacking weight of each question presented, wherein, for each question presented, when the at least one response to the question is the at least one associated correct response, the question property evaluator estimates the likelihood that the at least one response is a false positive using the question property evaluator, a response history of the user, and a response history of one or more other users; and establishing, by the question response evaluator, for each question presented, upon determination that the at least one response is the at least one correct response, a direct proportional relationship between the likelihood that the at least one response is a false positive and the likelihood of randomly selecting the at least one correct response, wherein the question response evaluator increases the likelihood that the at least one response is a false positive when the likelihood of randomly selecting the at least one correct response increases.

9. The computer-implemented method of claim 8, further comprising:

retrieving, for each question presented, the user response history from the user response history database;

comparing, by the question response evaluator for each question presented, the at least one response to the retrieved user response history database, wherein the question property evaluator increases the likelihood that the at least one response is a false positive upon an indication from the retrieved user response history that the at least one response is not the at least one associated correct response consecutively one or more times, and wherein the question property evaluator decreases the likelihood that the at least one response is a false positive upon an indication from the user response history that the at least one response is the at least one associated correct response consecutively one or more times.

10. The computer-implemented method of claim 8, further comprising:

retrieving, by the question property evaluator from the question database for each question presented, an amount of time the user takes to submit the at least one associated correct response and an average response time of the one or more other users to submit the at least one associated correct response;

adjusting, by the question property evaluator for each question presented, the average response time of the one or more other users to submit the at least one associated correct response to include that amount of time the user takes to submit the at least one associated correct response; and increasing, by the question response property evaluator for each question presented, the likelihood that the at least one response is a false positive upon determination that the amount of time the user takes to submit the at least one associated correct response is at least one standard deviation below the adjusted average response time to submit the at least one associated correct response.

11. The computer-implemented method of claim 10, further comprising:

retrieving, by the question property evaluator for each question presented upon determination that the at least one response is not the at least one associated response, the user response history from the user response history database; and adjusting, by the question property evaluator utilizing the question module, the average response time of the one or more other users to submit the at least one associated correct response upon indication from the retrieved user response history that the user previously submitted the at least one associated correct response, wherein the question property evaluator removes an amount of time the user took to previously submit the at least one associated correct response from the average response time of the one or more other users to submit the at least one associated correct response.

12. The computer-implemented method of claim 8, further comprising:

receiving, from the device associated with the user, a reported level of confidence for each question presented, adjusting, by the question response evaluator for each question presented upon determination that the received reported level of confidence is less than a certainty threshold, the likelihood that the at least one response to the question is a false positive to a value representative of a definite false positive.

13. The computer-implemented method according to claim 8, further comprising:

receiving, from the device associated with the user, a reported level of confidence for each question presented;

retrieving, by the question response evaluator, the user response history from the user response history database; and adjusting, by the question response evaluator for each question presented, the stacking weight using the received reported level of confidence, wherein the question response evaluator decreases the stacking weight by a first certainty weight upon determination that the received reported level of confidence is higher than a certainty threshold and upon an indication from the retrieved user response history that the at least one response is the at least one associated correct response one or more times, the question response evaluator increases the stacking weight by a second certainty weight upon determination that the reported level of confidence is lower than the certainty threshold and upon an indication from the retrieved user response history that the at least one response is the at least one associated correct response consecutively one or more times, the question response evaluator increases the stacking weight by a third certainty weight that is an amount higher than the second certainty weight upon determination that the reported level of confidence is lower than the certainty threshold and upon an indication from the retrieved user response history that the at least one response is not the at least one associated correct response consecutively one or more times, and the question response evaluator increases the stacking weight by an amount higher than the third certainty weight upon determination that the reported level of confidence is higher than the certainty threshold and upon an indication from the retrieved user response history that the at least one response is not the at least one associated correct response consecutively one or more times.

14. The computer implemented method according to claim 8, further comprising:

estimating, by the question property evaluator for each question presented, a likelihood of selecting one or more incorrect options, wherein the question property evaluator considers at least a percentage of a number of times that the one or more incorrect options are expected to be selected and a percentage of a number of times that the one or more incorrect options are selected; and establishing an inverse relationship between the likelihood that the at least one response is a false positive and the likelihood of selecting the one or more incorrect options, wherein the question property evaluator increases the likelihood that the at least one response is false positive when the likelihood of selecting the one or more incorrect options decreases.

15. A non-transitory computer-readable medium having instructions stored thereon, the instructions configured to cause the one or more processors to instruct:

a generator to present questions received from a processor to a question presentation device utilizing a question module and a question database having a plurality of questions, wherein the plurality of questions are associated with a stacking weight, wherein the plurality of questions are ordered according to the stacking weight of each question, and wherein each question presented includes at least one answer option and at least one associated correct response;

a question property evaluator to utilize the question module and question database to determine a likelihood of randomly selecting the at least one associated correct response for each question presented by calculating:

an inverse of a product of the number of answer options the user is instructed to select and a number of possible combinations of selection and non-selection of the answer options when the number of answer options the user is instructed to select is less than the number of answer options, or an inverse of two raised to a power of the number of answer options when the number of answer options the user is instructed to select is greater than or equal to the number of answer options, and wherein the question property evaluator considers, for each question presented, at least the number of answer options and a number of answer options a user is instructed to select;

a question response receiver to receive, from a device associated with the user, at least one response to each question presented utilizing a communications module; and a question response evaluator to, utilizing an evaluation module and a user response history database for each question presented:

determine, when the at least one response is the at least one associated correct response, a likelihood that the at least one response is a false positive using the question property evaluator, a response history of the user, and a response history of one or more other users, and adjust the stacking weight of each question presented within the question database depending at least upon the likelihood that the at least one response to the question is a false positive, and upon determination that the at least one response is the at least one associated correct response, increase the likelihood that the at least one response is a false positive upon an increase in the likelihood of randomly selecting the at least one correct response.

16. The non-transitory computer-readable medium according to claim 15, wherein the instructions are further configured to cause the one or more processors to instruct:

the question response evaluator to, utilizing the evaluation module and the user response history database for each question presented, increase the likelihood that the at least one response is a false positive upon an indication from the user response history that the at least one response is not the at least one associated correct response consecutively one or more times, and decrease the likelihood that the at least one response is a false positive upon an indication from the user response history that the at least one response is the at least one associated correct response consecutively one or more times.

17. The non-transitory computer-readable medium according to claim 15, wherein the instructions are further configured to cause the one or more processors to instruct:

the question property evaluator to, utilizing the question module and question database for each question presented, determine an amount of time the user takes to submit the at least one associated correct response, and determine, from the response history of the one or more other users the amount of time the user takes to submit the at least one associated correct response, an average response time of the one or more other users and the user to submit the at least one associated correct response, and the question response evaluator to, utilizing the evaluation module and question database for each question presented, increase the likelihood that the at least one response is a false positive upon determination that the amount of time the user takes to submit the at least one associated correct response is at least one standard deviation below the average response time of the one or more other users and the user to answer to submit the at least one associated correct response.

18. The non-transitory computer-readable medium according to claim 17, wherein the instructions are further configured to cause the one or more processors to instruct:

the question property evaluator to, utilizing the question module and the user response history database for each question presented, remove an amount of time the user took to previously submit the at least one associated correct response from the average response time of the one or more other users and the user to submit the at least one associated correct response upon determination that the at least one response is not the at least one associated correct response and the user response history indicates that the user previously submitted the at least one associated correct response.

19. The non-transitory computer-readable medium according to claim 15, wherein the instructions are further configured to cause the one or more processors to instruct:

the question response evaluator to, utilizing the evaluation module upon determination that the user is permitted to report a level of confidence for each question presented, set the likelihood that the at least one response is a false positive to a value representative of a definite false positive when the reported level of confidence is less than a certainty threshold.

20. The non-transitory computer-readable medium according to claim 15, wherein the instructions are further configured to cause the one or more processors to instruct:

the question response evaluator to, utilizing the evaluation module and user response history database upon determination that the user is permitted to report a level of confidence for each question presented, determine a first certainty weight that decreases the stacking weight upon determination that the reported level of confidence is higher than a certainty threshold and upon an indication from the user response history that the at least one response is the at least on associated correct response consecutively one or more times, determine a second certainty weight that increases the stacking weight upon determination that the reported level of confidence is lower than the certainty threshold and upon an indication from the user response history that the at least one response is the at least on associated correct response consecutively one or more times, determine a third certainty weight that increases the stacking weight by an amount higher than the second certainty weight upon determination that the reported level of confidence is lower than the certainty threshold and upon an indication from the user response history that the at least one response is not the at least on associated correct response consecutively one or more times, and determine a fourth certainty weight that increases the stacking weight by an amount higher than the third certainty weight upon determination that the reported level of confidence is higher than the certainty threshold and upon an indication from the user response history that the at least one response is not the at least on associated correct response consecutively one or more times.

21. The non-transitory computer-readable medium according to claim 15, wherein the instructions are further configured to cause the one or more processors to instruct:

the question property evaluator to, utilizing the question module and question database for each question presented, determine a likelihood of selecting one or more incorrect options, wherein the question property evaluator considers at least a percentage of a number of times that the one or more incorrect options are expected to be selected and a percentage of a number of times that the one or more incorrect options are selected, and the question response evaluator to, utilizing the evaluation module for each question presented, increase the likelihood that the at least one response is a false positive upon a decrease in the likelihood of selecting the one or more incorrect options.

22. A system for assessment driven learning, the system comprising:

means for displaying questions on a question presentation device utilizing a question database having a plurality of questions, wherein the plurality of question are associated with a stacking weight, wherein the plurality of questions are ordered according to the stacking weight of each question, and wherein each question presented includes at least two answer options and at least on associated correct response;

means for determining, for each question presented, a likelihood of randomly selecting the at least one associated correct response by calculating an inverse of a product of the number of answer options the user is instructed to select and a number of possible combinations of selection and non-selection of the answer options when the number of answer options the user is instructed to select is less than the number of answer options, or an inverse of two raised to a power of the number of answer options when the number of answer options the user is instructed to select is greater than or equal to the number of answer options;

means for receiving, from a device associated with the user, at least one response to each question presented;

means for determining, for each question presented, when the at least one response is the at least on associated correct response, a likelihood that the at least one response to the question is a false positive using the means for determining the likelihood of randomly selecting the at least one associated correct response, a response history of the user, and a response history database indicating a response history of one or more other users;

means for adjusting the stacking weight of the question depending at least upon the likelihood that the at least one response to the question is a false positive; and means for increasing, for each question presented and upon determination that the at least one response to the question is the at least one correct response, the likelihood that the at least one response to the question is a false positive upon an increase in the likelihood of randomly selecting the at least one correct response.

23. The system according to claim 22, further comprising:

means for increasing, for each question presented, the likelihood that the at least one response to the question is a false positive upon an indication from the user response history that the at least one response is not the at least one associated correct response consecutively one or more times; and means for decreasing, for each question presented, the likelihood that the at least one response to the question is a false positive upon an indication from the user response history that the at least one response is the at least one associated correct response consecutively one or more times.

24. The system of claim 22, further comprising:

means for determining, for each question presented, an amount of time the user takes to submit the at least one associated correct response;

means for determining, for each question presented, an average response time of the one or more other users and the user to submit the at least one associated correct response using the response history of the one or more other users and the amount of time the user takes to submit the at least one associated correct response; and means for increasing, the likelihood that the at least one response is a false positive upon determination that the amount of time the user takes to submit the at least one associated correct response is at least one standard deviation below the average response time of the one or more other users and the user to submit the at least one associated correct response.

25. The system according to claim 22, further comprising:

means for determining, upon determination that the user is permitted to report a level of confidence for each question presented, a first certainty weight that decreases the stacking weight upon determination that the reported level of confidence is higher than a certainty threshold and upon an indication from the user response history that the at least one response is the at least one associated correct response one or more times, a second certainty weight that increases the stacking weight upon determination that the reported level of confidence is lower than the certainty threshold and upon an indication from the user response history that the at least one response is the at least one associated correct response consecutively one or more times, a third certainty weight that increases the stacking weight by an amount higher than the second certainty weight upon determination that the reported level of confidence is lower than the certainty threshold and upon an indication from the user response history that the at least one response is not the at least one associated response consecutively one or more times, and a fourth certainty weight that increases the stacking weight by an amount higher than the third certainty weight upon determination that the reported level of confidence is higher than the certainty threshold and upon an indication from the user response history that the at least one response is not the at least one associated correct response consecutively one or more times.

26. The system according to claim 22, further comprising:

means for determining, for each question presented, a likelihood of selecting one or more incorrect options using at least a percentage of a number of times that the one or more incorrect options are expected to be selected and at least a percentage of a number of times that the one or more incorrect options are selected; and means for increasing, for each question presented, the likelihood that the at least one response to the question is a false positive upon a decrease in the likelihood of selecting the one or more incorrect options.

* * * * *